US011516139B2

(12) United States Patent
Ismailsheriff et al.

(10) Patent No.: US 11,516,139 B2
(45) Date of Patent: Nov. 29, 2022

(54) TRAFFIC CLASS-SPECIFIC CONGESTION SIGNATURES FOR IMPROVING TRAFFIC SHAPING AND OTHER NETWORK OPERATIONS

(71) Applicant: Cisco Technology, Inc., San Jose, CA (US)

(72) Inventors: Akramsheriff Ismailsheriff, San Jose, CA (US); Santosh Ramrao Patil, Santa Clara, CA (US); Gonzalo Salgueiro, Raleigh, NC (US); M. David Hanes, Lewisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 17/110,196

(22) Filed: Dec. 2, 2020

(65) Prior Publication Data
US 2021/0092068 A1 Mar. 25, 2021

Related U.S. Application Data

(63) Continuation of application No. 16/560,458, filed on Sep. 4, 2019, now Pat. No. 10,873,533.

(51) Int. Cl.
*H04L 12/851* (2013.01)
*H04L 12/801* (2013.01)
(Continued)

(52) U.S. Cl.
CPC ......... *H04L 47/2441* (2013.01); *H04L 47/12* (2013.01); *H04L 47/22* (2013.01);
(Continued)

(58) Field of Classification Search
CPC ......... H04L 47/22; H04L 47/12; H04L 47/27; H04L 47/29; H04L 47/2441; H04L 47/283
See application file for complete search history.

(56) References Cited

U.S. PATENT DOCUMENTS

| 9,552,550 | B2 | 1/2017 | Vasseur et al. |
| 10,187,413 | B2 | 1/2019 | Vasseur et al. |
| 10,469,385 | B2* | 11/2019 | Heinz ............... H04L 47/15 |
| 2002/0159386 | A1 | 10/2002 | Grosdidier et al. |

(Continued)

OTHER PUBLICATIONS

Mittal, Radhika, "Towards a More Stable Network Infrastructure," https://escholarship.org/uc/item/33n1g8hz, Aug. 7, 2018.

*Primary Examiner* — Brian D Nguyen
(74) *Attorney, Agent, or Firm* — Polsinelli

(57) ABSTRACT

Systems and methods provide for generating traffic class-specific congestion signatures and other machine learning models for improving network performance. In some embodiments, a network controller can receive historical traffic data captured by a plurality of network devices within a first period of time that the network devices apply one or more traffic shaping policies for a predetermined traffic class and a predetermined congestion state. The controller can generate training data sets including flows of the historical traffic data labeled as corresponding to the predetermined traffic class and predetermined congestion state. The controller can generate, based on the training data sets, traffic class-specific congestion signatures that receive input traffic data determined to correspond to the predetermined traffic class and output an indication whether the input traffic data corresponds to the predetermined congestion state. The controller can adjust, based on the congestion signatures, traffic shaping operations of the plurality of network devices.

20 Claims, 8 Drawing Sheets

(51) Int. Cl.
*H04L 12/807* (2013.01)
*H04L 12/815* (2013.01)
*H04L 12/841* (2013.01)
*H04L 47/2441* (2022.01)
*H04L 47/22* (2022.01)
*H04L 47/27* (2022.01)
*H04L 47/12* (2022.01)
*H04L 47/283* (2022.01)
*H04L 47/10* (2022.01)

(52) U.S. Cl.
CPC ............ *H04L 47/27* (2013.01); *H04L 47/283* (2013.01); *H04L 47/29* (2013.01)

(56) References Cited

U.S. PATENT DOCUMENTS

| | | |
|---|---|---|
| 2004/0225916 A1 | 11/2004 | Clark |
| 2012/0099725 A1 | 4/2012 | Sakazaki et al. |
| 2012/0230186 A1 | 9/2012 | Lee et al. |
| 2012/0327816 A1* | 12/2012 | Morrill ................ H04M 15/43 370/259 |
| 2014/0310405 A1* | 10/2014 | Pope .................... H04L 69/326 709/224 |
| 2016/0182329 A1 | 6/2016 | Armolavicius et al. |
| 2017/0149665 A1 | 5/2017 | Yousaf et al. |
| 2018/0212885 A1 | 7/2018 | Contavelli et al. |
| 2019/0190830 A1 | 6/2019 | Litzinger |
| 2019/0334825 A1* | 10/2019 | Nadas .................. H04L 1/1874 |
| 2020/0059426 A1 | 2/2020 | Raleigh et al. |
| 2020/0128437 A1* | 4/2020 | Caretti .................... H04W 4/80 |
| 2020/0236043 A1* | 7/2020 | Sze ....................... H04L 43/106 |
| 2022/0225163 A1* | 7/2022 | Sharma ................ H04L 1/1642 |

* cited by examiner

TRAFFIC CLASS-SPECIFIC CONGESTION SIGNATURES FOR IMPROVING TRAFFIC SHAPING AND OTHER NETWORK OPERATIONS

CROSS-REFERENCE TO RELATED APPLICATION

This application is a continuation of U.S. Non-Provisional patent application Ser. No. 16/560,458, filed on Sep. 4, 2019, now U.S. Pat. No. 10,873,533, issued on Dec. 22, 2020, the full disclosure of which is hereby expressly incorporated by reference in its entirety.

TECHNICAL FIELD

The subject matter of this disclosure relates in general to the field of computer networking, and more particularly, to systems and methods for generating and applying traffic class-specific congestion signatures and other machine learning models for improving network performance.

BACKGROUND

An access network can provide connectivity to computing devices (e.g., servers, workstations, desktop computers, laptop computers, tablets, mobile phones, etc.) and things (e.g., desk phones, security cameras, lighting, windows, doors, locks, medical devices, industrial and manufacturing equipment, etc.) within environments such as offices, hospitals, colleges and universities, oil and gas facilities, factories, and similar locations. Some of the unique challenges an access network may face include integrating wired and wireless devices, on-boarding computing devices and things that can appear anywhere in the network and maintaining connectivity when the devices and things migrate from location to location within the network, supporting Bring Your Own Device (BYOD) capabilities, connecting and powering Internet-of-Things (IoT) devices, and securing the network despite the vulnerabilities associated with Wi-Fi access, device mobility, BYOD, and IoT. Current approaches for deploying a network capable of providing these functions often require constant and extensive configuration and administration by highly skilled network engineers operating several different systems (e.g., directory-based identity services; Authentication, Authorization, and Accounting (AAA) services, Wireless Local Area Network (WLAN) controllers; Command Line Interfaces (CLIs) for each switch, router, or other network device; etc.) and manually stitching these systems together. This can make network deployment difficult and time-consuming, and impede the ability of many organizations to innovate rapidly and to adopt new technologies, such as video, collaboration, and connected workspaces.

Another challenge faced by access networks is the greater amount of traffic they carry and the greater diversity of traffic flowing across their infrastructure than ever before. Being able to properly understand these traffic flows, optimize them, and plan for future network and application growth and change are imperative for any organization. The foundation for such an understanding is greater visibility into what types of traffic and applications are flowing within the network, and how these applications are performing relative to business-critical objectives of the organization. Many organizations today lack the understanding they need for the flow and operation of various traffic types within their networks. Compounding these difficulties can be the relative inflexibility of the network devices that handle much of the heavy lifting of connecting users, devices, and things to the network. Network devices must be able to accommodate a wide range of network topologies, types of traffic, connectivity options, applications, users, devices, and things but are constrained by the hardware resources (e.g., processing, memory, storage, etc.) available to them.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
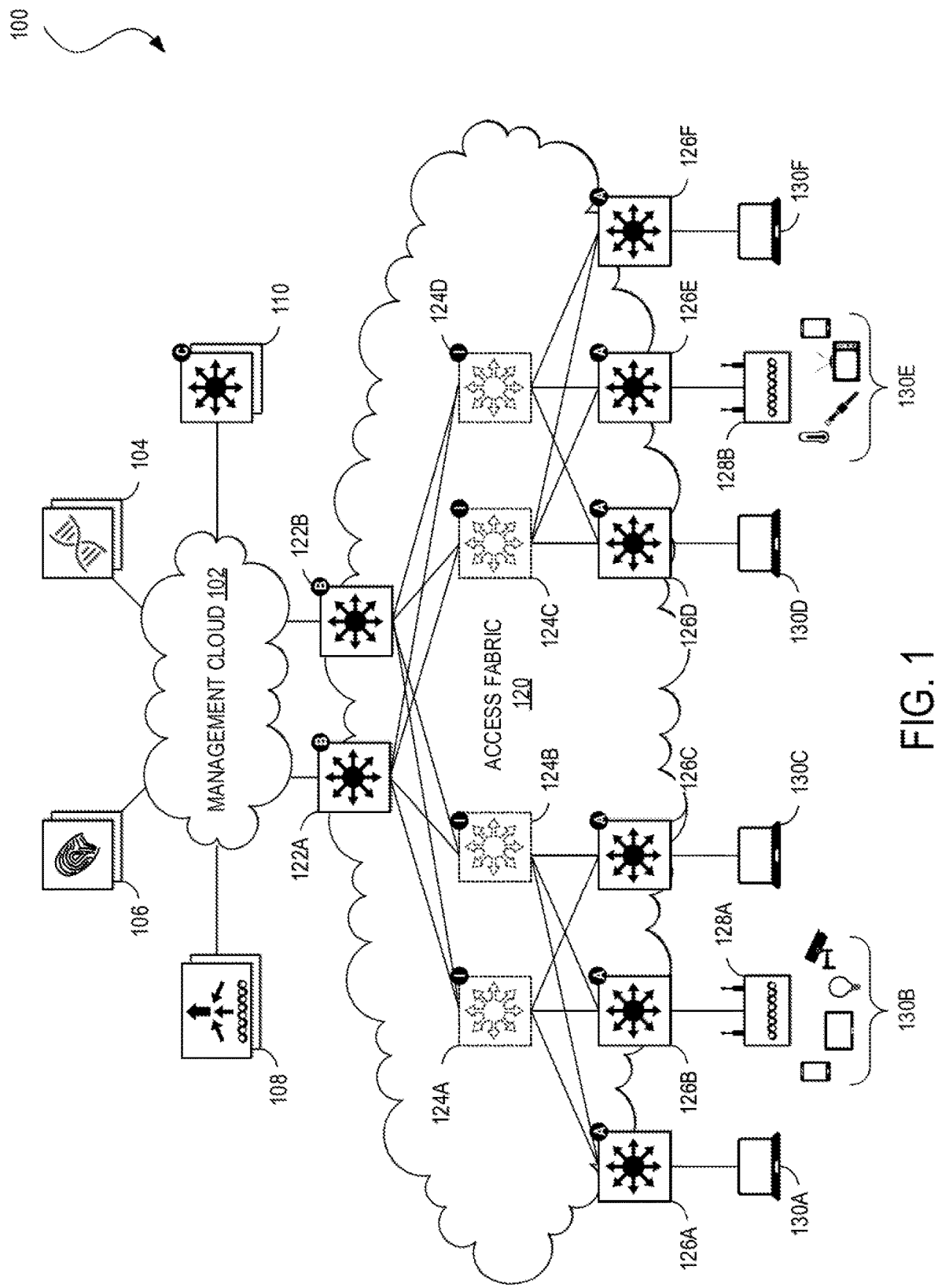
FIG. 1 illustrates an example of an access network in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for generating traffic class-specific congestion signatures and other machine learning models for improving network performance. In some embodiments, a network controller can receive historical traffic data captured by a plurality of network devices within a first period of time that the plurality of network devices apply one or more traffic shaping policies for one or more traffic classes (including at least one predetermined traffic class) and one or more congestion states (including at least one predetermined congestion state). The network controller can generate one or more training data sets including flows of the historical traffic data labeled as corresponding to the one or more traffic classes and the one or more congestion states. The network controller can generate, based on the one or more training data sets, one or more traffic class-specific congestion signatures that receive input traffic data determined to correspond to the one or more traffic classes and output an indication whether the input traffic data corresponds to the one or more congestion states. The network controller can adjust, based on output of the one or more traffic class-specific congestion signatures applied to current traffic data captured by the plurality of network devices within a current period of time, one or more traffic shaping operations of one or more of the plurality of network devices.

EXAMPLE EMBODIMENTS

Traffic shaping is a mechanism for managing network traffic congestion that can involve the creation of queues, assignment of traffic to those queues based on a classification of the traffic, and scheduling of the traffic in a queue for transmission. During periods with light traffic (e.g., when there is no congestion), traffic may be sent out of an outgoing interface of a network device as soon as it arrives. During periods of congestion at the outgoing interface, traffic may arrive faster than the interface can send it. If a network device implements traffic shaping, traffic accumulating at an interface can be queued at the interface's buffer until the interface is free to send it; the traffic can then be scheduled for transmission according to its assigned priority and the queuing mechanism configured for the interface. The network device can determine the order of transmission by controlling which traffic is placed in which queue and how queues are serviced with respect to each other.

The effectiveness of traffic shaping can depend on how a network operator configures flow and congestion control within a network. A significant amount of network traffic today runs over Transmission Control Protocol (TCP). TCP is a transport protocol that takes a stream of data from an application, and can transport it reliably end to end. TCP divides the stream into segments and hands them off to IP for transmission as packets through the network. TCP can handle detection and retransmission of lost segments and may not pass the stream's data to the application until it can be delivered in order. Packet loss can add latency while the segment is recovered. This means that loss and latency can be effectively equivalent from an application's perspective when using TCP.

Congestion control is a mechanism that TCP can use to determine when to transmit segments. To implement congestion control, TCP can probe the network by increasing the rate of transmission in order to determine the optimal rate as represented by the number of packets "in flight" at any given time. Once it finds this level, TCP can continually adjust transmission of traffic based on signals from the network (e.g., packet loss, RTT, etc.). Each end of a TCP session can maintain two independent windows that determine how many unacknowledged segments may be in transit at a time, a receive window (rwnd) and a congestion window (cwnd). The receive window can be advertised in the TCP header. The receive window may communicate the available buffer capacity on the TCP receiver, and can change when the buffer fills. The TCP sender may not have more unacknowledged segments in the network than the value of the receive window as doing so can cause an overflow of the receiver's buffer. The congestion window can represent the network capacity to support the flow. At any given time, the minimum of the two windows or the window size W (sometimes also referred to as the send window, transmit window, effective window, etc.) can govern the number of unacknowledged segments that may be in transit. Releasing new segments as previous segments are acknowledged can have the effect of clocking and pacing the network, and action may be taken when this clock times out and the network is assumed to be in a congested state.

TCP can use several different strategies for managing congestion, such as slow start, congestion avoidance, fast retransmit, and fast recovery. Slow start can start the congestion window or window size W at some small multiple of the Maximum Segment Size (MSS) and grow by 1 MSS with each ACK, and increase the size of the congestion window by allowing an additional packet to be "in flight" every time an ACK is received. Thus, each segment acknowledged allows two new segments to be sent. This can effectively double the congestion window or window size W every RTT and result in an exponential increase in the congestion window or window size W. Once the congestion window or window size W reaches a certain size, a congestion threshold T (sometimes also referred to as the slow start threshold (ssthresh)), the TCP session can transition from slow start to congestion avoidance. In congestion avoidance, the congestion window or window size W can increase linearly rather than exponentially (e.g., one MSS per RTT).

As part of the acknowledgment process, the TCP receiver can implicitly inform the sender when the receiver receives segments out of order. This can occur when the TCP sender receives multiple ACKs for the same segment. The receiver may communicate that it has received a new segment but can only acknowledge the previous segment since there is a gap. This can trigger fast retransmit. For example, if the receiver has segments 0-550, receives segments 552 and 553, and loses segment 551, then the receiver can send a duplicate ACK for 550 for each later segment received in this scenario (i.e., 3 ACKs for 550). The 3 duplicate ACKs for the segment 550 can allow the sender to retransmit sooner than waiting for a Retransmission Timeout (RTO). In some implementations of TCP, the receiver can send a selective ACK acknowledging discontinuous blocks of segments received correctly along with the sequence number of the last contiguous byte received successfully (e.g., an ACK for 550, 552, and 553), and the TCP sender may retransmit only segment 551.

In some implementations of TCP, a lost segment may always reset transmission to slow start. Fast recovery can avoid returning to slow start if the loss is detected via duplicate ACKs. Thus, instead of beginning transmission at slow start when fast retransmit is triggered, the congestion window or window size W and the congestion threshold T can both be set to half the current congestion window or window size W, and the session can remain in congestion avoidance mode. This effectively skips over slow start. While the missing segment is being resolved, the acknowledgment of further out-of-order segments can allow new segments to be transmitted while still maintaining the allowed number of segments in flight. The duplicate ACKs do not trigger an increase in the congestion window. If fast retransmit is not successful, a timeout can occur, and the session can revert to slow start. In some implementations of TCP, regular retransmission and a reset to slow start can occur if more than one segment is lost within an RTT. If the same segment is retransmitted multiple times, the timeout window can increase exponentially, and the session performance may be significantly impacted.

For traffic shaping to be effective, it can be important to identify the optimal window size W and/or the optimal congestion threshold T for a flow to achieve transmission as close to network capacity as possible without experiencing traffic loss. Setting too large of a value for the window size W can cause severe losses at a bottleneck link if the window size W overshoots the actual network capacity, and setting the window size W too small can inflate latency. The congestion threshold T is also an important factor for the TCP sender to determine when to transition between slow start and congestion avoidance. If the congestion threshold T is set too small, the TCP sender will enter congestion avoidance earlier than necessary. This can waste capacity and result in unfairness (e.g., flows of the same traffic class not receiving an equal proportion of bandwidth allocated to that traffic class). On the other hand, if the congestion threshold T is too large, the TCP sender may send too much traffic into a congested link and further increase congestion. In a worst case scenario, too large of a congestion threshold T may cause a congestion collapse where the network settles into a stable state in which traffic demand is high but there is little throughput due to packet delay and loss.

The effectiveness of traffic shaping can also depend on the hardware of a network device (e.g., switch, router, etc.), such as its Central Processing Unit (CPU) or Network Processing Unit (NPU) (e.g., chip), memory (e.g., on-chip memory), interface buffers (e.g., off-chip memory), and so forth. For example, traffic shaping can deny bandwidth to lower priority traffic in favor of higher priority traffic and may result in dropped traffic when the network device has insufficient buffer space to accommodate all traffic. Conventional traffic shaping can slow down traffic by adjusting the transmission rate of acknowledgments (e.g., Transport Control Protocol (TCP) Acknowledgments (ACKs)) to adjust the transmission rate of traffic using congestion control. To adjust the transmission rate of acknowledgments, conventional traffic shaping can buffer all acknowledgments and schedule their transmission according to a rate specified by the network's traffic shaping policies. This can require storage of a significant number of acknowledgments and a large buffer space, which can be a relatively scarce resource for network devices. Traffic shaping can also introduce additional processing overhead, such as to monitor, classify, and schedule traffic. This can induce unacceptable levels of latency depending on the network device's CPU and memory and traffic loads. Conventional traffic shaping often utilizes a static configuration, and a network device's hardware establishes the upper bounds of its capacity. A network device may encounter diverse types of traffic, and can reach obsolescence much more rapidly than expected if it is incapable of adapting to changing network conditions.

Various embodiments of the present disclosure can overcome the above and other deficiencies of the prior art by generating traffic class-specific congestion signatures, window size and/or congestion threshold estimators, and reinforcement learning agents that network devices can apply to improve network performance. For example, a network device can apply the traffic class-specific signatures to determine whether a given flow corresponds to a predetermined traffic class and predetermined congestion state. If the flow corresponds to the predetermined traffic class and predetermined congestion state, the network device can calculate the current window size $W_{LATEST}$ and/or the congestion threshold $T_{LATEST}$ utilizing one or more window size and/or congestion threshold estimators to evaluate the current extent of congestion in the network. The network device can pace or adjust the transmission rate or throughput TR of the flow according to a target transmission rate $TR_{TGT}$ for the traffic class and congestion state to which the flow corresponds. In some embodiments, the network device may also utilize a reinforcement learning agent to determine whether to perform Selective Tracking of Acknowledgments (STACKing, e.g., stacking acknowledgment information in a network device's main memory or on-chip memory stack instead of the device's interface buffers or off-chip memory) to improve buffer utilization and further improve traffic shaping for one or more network devices.

FIG. 1 illustrates a block diagram of an example of an access network 100. It should be understood that, for the access network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the access network 100 can include any number or type of resources, which can be accessed and utilized by endpoints or network devices. The illustrations and examples provided herein are for clarity and simplicity.

An access network can refer to a Local Area Network (LAN), a Layer 2 or virtual Layer 2 network, an enterprise network, or other network in which nodes (e.g., endpoints, network devices, etc.) can connect directly (e.g., single hop) or indirectly (e.g., multiple hops) to one another without a Wide Area Network (WAN) transport network. For example, an access network can include a data center network, a campus network, a branch network, and the like. In this example, the access network 100 includes a management cloud 102 and an access fabric 120. Although shown as an external network or cloud external to the access fabric 120 in this example, the management cloud 102 may alternatively or additionally reside on the premises of an organization or in a colocation center (in addition to being hosted by a cloud provider or similar environment). The management cloud 102 can provide a central management plane for building and operating the access fabric 120. The management cloud 102 can be responsible for forwarding configuration and policy distribution, as well as device management and analytics. The management cloud 102 can comprise one or more access fabric controller appliances 104, one or more Authentication, Authorization, and Accounting (AAA) appliances 106, one or more Wireless Local Area Network (LAN) Controllers (WLCs) 108, and one or more access fabric control plane devices 110 (e.g., referred to as fabric control plane nodes in Cisco® Software-Defined Access (SD-Access) and Cisco® Digital Network Architecture (Cisco DNA™)). In other embodiments, one or more components of the management cloud 102 may be co-located with the access fabric 120.

The access fabric controller appliances 104 can function as the command and control system for one or more access fabrics 120, and can house automated workflows for deploying and managing the access fabrics. The access fabric controller appliances 104 can provide automation, design, policy, provisioning, and assurance workflows, among others, as discussed further below with respect to FIG. 2. In some embodiments, the Cisco® SD-Access controller can operate as the access fabric controller appliances 104, and can reside in one or more Cisco Digital Network Architecture (Cisco DNA™) appliances.

The AAA appliances 106 can control access to computing resources, facilitate enforcement of network policies, audit usage, and provide information necessary to bill for services. The AAA appliances 106 can interact with the access fabric controller appliances 104, other network controllers (e.g., a data center network controller, a WAN controller, etc.), and other databases and directories containing information for users, devices, things, policies, billing, and similar information to provide authentication, authorization, and accounting services. In some embodiments, the AAA appliances 106 can utilize Remote Authentication Dial-In User Service (RADIUS) or Diameter to communicate with devices and applications. In some embodiments, one or more Cisco® Identity Services Engine (ISE) appliances can operate as the AAA appliances 106.

The WLCs 108 can support wireless access points (e.g., wireless access points 128A and 128B (collectively, 128)) attached to the access fabric 120, handling traditional tasks associated with a WLC as well as interactions with the access fabric control plane devices 110 for wireless endpoint registration and roaming. In some embodiments, the access fabric 120 can implement a wireless deployment that moves data-plane termination (e.g., VXLAN) from a centralized location (e.g., with previous overlay Control and Provisioning of Wireless Access Points (CAPWAP) deployments) to one or more wireless access points/access layer devices. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLCs 108.

The access fabric 120 can comprise access fabric border devices 122A and 122B (referred to as fabric border nodes in Cisco® SD-Access) (collectively, 122), access fabric intermediate devices 124A-D (referred to as fabric intermediate nodes in Cisco® SD-Access) (collectively, 124), and access fabric access layer devices 126A-F (referred to as fabric edge nodes in Cisco® SD-Access) (collectively, 126). Although the access fabric control plane devices 110 are shown to be external to the access fabric 120 in this example, in other embodiments, the access fabric control plane devices 110 may be co-located with the access fabric 120. In embodiments where the access fabric control plane devices 110 are co-located with the access fabric 120, the access fabric control plane devices 110 may comprise a dedicated network device or set of network devices, or the functionality of the access fabric control plane devices 110 may be implemented by the access fabric border devices 122.

The access fabric control plane devices 110 can serve as a central database for tracking all users, devices, and things as they attach to the access fabric 120, and as they roam around. The access fabric control plane devices 110 can allow network infrastructure (e.g., switches, routers, WLCs, etc.) to query the database to determine the locations of users, devices, and things attached to the access fabric 120 instead of using a flood and learn mechanism. In this manner, the access fabric control plane devices 110 can operate as a single source of truth about where every endpoint attached to the access fabric 120 is located at any point in time. In addition to tracking specific endpoints (e.g., /32 address for Internet Protocol version v4 (IPv4), /128 address for Internet Protocol version 6 (IPv6), etc.), the access fabric control plane devices 110 can also track summary prefixes (e.g., Internet Protocol (IP)/mask). This flexibility can help in summarization across access fabric sites and improve overall scalability.

The access fabric border devices 122 can connect the access fabric 120 to traditional Layer 3 networks (e.g., non-fabric networks) or to different access fabric sites. The access fabric border devices 122 can also translate context (e.g., user, device, or thing mapping and identity) from one access fabric site to another access fabric site or to a traditional Layer 3 network. When the encapsulation is the same across different access fabric sites, the translation of access fabric context can generally be mapped one to one. The access fabric border devices 122 can also exchange reachability and policy information with access fabric control plane devices of different access fabric sites. The access fabric border devices 122 can also provide border functions for internal networks and external networks. Internal borders can advertise a defined set of known subnets, such as those leading to a group of branch sites or to a data center. External borders, on the other hand, can advertise unknown destinations (e.g., to the Internet and similar in operation to the function of a default route).

The access fabric intermediate devices 124 can operate as Layer 3 forwarders that connect the access fabric border devices 122 to the access fabric access layer devices 126, and can provide the Layer 3 underlay for fabric overlay traffic. The access fabric access layer devices 126 can connect endpoints to the access fabric 120 and can encapsulate/de-encapsulate and forward traffic from these endpoints to and from the network fabric. The access fabric access layer devices 126 can operate at the perimeter of the access fabric 120, and may be the first points for attachment of users, devices, and things and the implementation of policy. In some embodiments, the access fabric 120 can also include access fabric extended devices (referred to as fabric extended nodes in Cisco® SD-Access) (not shown) for attaching downstream non-fabric Layer 2 network devices to the access fabric 120 and thereby extend the access fabric 120. For example, access fabric extended devices can be small switches (e.g., compact switch, industrial Ethernet switch, building automation switch, etc.) which connect to the access fabric access layer devices 126 via Layer 2. Endpoints and network devices connected to the access fabric extended devices can use the access fabric access layer devices 126 for communication to outside subnets.

In this example, the network fabric 120 can represent a single access fabric site deployment which can be differentiated from a multi-site access fabric deployment as discussed further below with respect to FIG. 3 and elsewhere in the present disclosure. In some embodiments, all subnets hosted in an access fabric site can be provisioned across every access fabric access layer device 126 in that access fabric site. For example, if the subnet 10.10.10.0/24 is provisioned in a given access fabric site, this subnet may be defined across all of the access fabric access layer devices 126 in that fabric site, and endpoints located in that subnet can be placed on any access fabric access layer device 126 in that access fabric site. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRv's), Cisco Integrated Services Virtual Routers (ISRv's), Cisco Meraki® MX appliances, and/or other Cisco DNA-Ready™ devices can operate as the access fabric devices 110, 122, 124, and 126.

The access network 100 can also include wired endpoints 130A, 130C, 130D, and 130F and wireless endpoints 130B and 130E (collectively, 130). The wired endpoints 130A, 130C, 130D, and 130F can connect by wire to access fabric access layer devices 126A, 126C, 126D, and 126F, respectively, and the wireless endpoints 130B and 130E can connect wirelessly to wireless access points 128A and 128B, respectively, which in turn can connect by wire to access fabric access layer devices 126B and 126E, respectively. In some embodiments, Cisco Aironet® access points, Cisco Meraki® MR access points, and/or other Cisco DNA™-ready access points can operate as the wireless access points 128.

The endpoints 130 (sometimes also referred to as hosts, clients, servers, devices, things, etc.) can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, Heating, Ventilation, and Air Conditioning (HVAC) equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, Point of Sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the access fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLCs 108 notifying the access fabric control plane devices 110 of joins, roams, and disconnects by the wireless endpoints 130 such that the access fabric control plane devices 110 can have connectivity information about both wired and wireless endpoints in the access fabric 120, and can serve as the single source of truth for endpoints connected to the access fabric 120. For data plane integration, the WLCs 108 can instruct the wireless access points 128 to form a VXLAN overlay tunnel to their adjacent access fabric access layer devices 126. The VXLAN tunnel can carry segmentation and policy information to and from the access fabric access layer devices 126, allowing connectivity and functionality identical or similar to that of a wired endpoint. When the wireless endpoints 130 join the access fabric 120 via the wireless access points 128, the WLCs 108 can onboard the endpoints into the access fabric 120 and inform the access fabric control plane devices 110 of the endpoints' Media Access Control (MAC) addresses. The WLCs 108 can then instruct the wireless access points 128 to form VXLAN overlay tunnels to the adjacent access fabric access layer devices 126. Next, the wireless endpoints 130 can obtain IP addresses for themselves via Dynamic Host Configuration Protocol (DHCP). Once that completes, the access fabric access layer devices 126 can register the IP addresses of the wireless endpoint 130 to the access fabric control plane devices 110 to form a mapping between the endpoints' MAC and IP addresses, and traffic to and from the wireless endpoints 130 can begin to flow.

Figure 2:
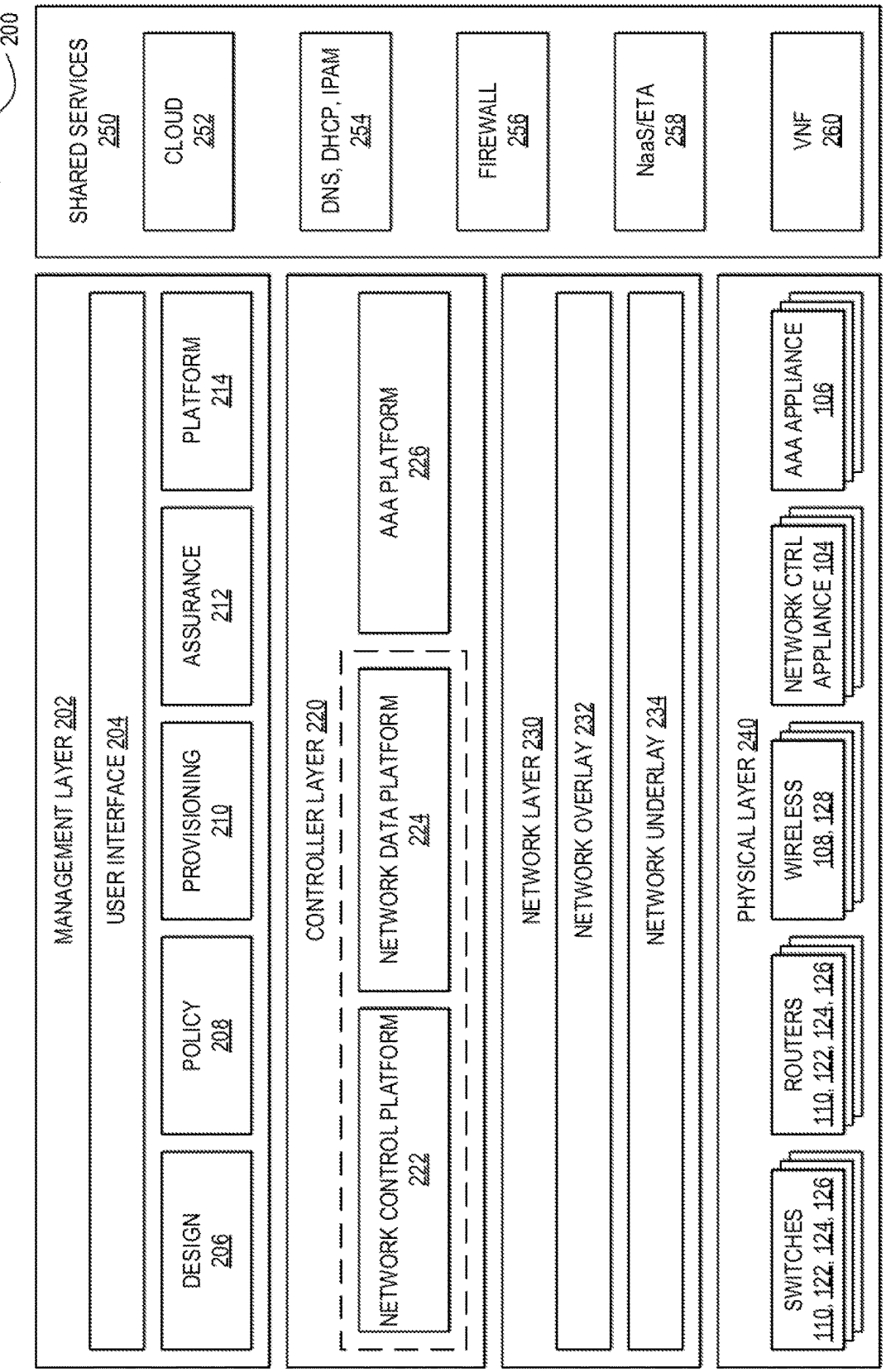
FIG. 2 illustrates an example of a network management system in accordance with an embodiment.

FIG. 2 illustrates an example of a network management system 200 for the access network 100 and other networks. One of ordinary skill in the art will understand that, for the network management system 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the network management system 200 includes a management layer 202, a controller layer 220, a network layer 230, a physical layer 240, and shared services 250. An example of an implementation of the network management system 200 is the Cisco® SD-Access or Cisco DNA™ platform.

The management layer 202 can abstract the complexities and dependencies of other layers and provide a user with tools and workflows to manage the access network 100). The management layer 202 can include a user interface 204 for an administrator to execute design workflows 206, policy workflows 208, provisioning workflows 210, assurance workflows 212, and platform workflows 214 of the network management system 200. An example of an implementation of the user interface 204 is Cisco DNA™ Center. The user interface 204 can provide the administrator a single point to manage and automate the access network 100. The user interface 204 can be implemented within one or more web applications/web servers accessible by a web browser and/or one or more applications/application servers accessible by a desktop application, a mobile app, a shell program or other Command Line Interface (CLI), an Application Programming Interface (e.g., Network Configuration (NETCONF) Protocol, Restful State Transfer (REST), Simple Object Access Protocol (SOAP), Service Oriented Architecture (SOA), etc.), a Software Development Kit (SDK) for a programming language such as C++, GO, JAVA, JAVASCRIPT, NODE.JS, PHP, PYTHON, RUBY, and so forth, and/or other suitable interface in which the administrator can configure network infrastructure locally or via the cloud; provide user preferences; specify policies, enter data; review statistics; configure interactions or operations; and so forth. The user interface 204 may also provide visibility information, such as views of the nodes of the access network 100 (e.g., the endpoints 130, the network devices 104, 108, 110, 122, 124, or 128, the AAA appliance 106, etc.). For example, the user interface 204 can provide a view of the status or conditions of the access network 100, the operations taking place, services, performance, a topology or layout, protocols implemented, running processes, errors, notifications, alerts, network structure, ongoing communications, data analysis, and so forth.

The design workflows 206 can include functions for managing site profiles, maps and floor plans, network settings, and IP address management, among others. The policy workflows 208 can include functions for defining and managing network policies. The provisioning workflows 210 can include functions for deploying the access network 100. The assurance workflows 212 can use machine learning and analytics to provide end-to-end visibility of the access network 100 by learning from the endpoints, network devices, appliances, and other contextual sources of information. The platform workflows 214 can include functions for integrating the access network 100 with other technologies.

In some embodiments, the design workflows 206, the policy workflows 208, the provisioning workflows 210, the assurance workflows 212, and the platform workflows 214 can be implemented as microservices in which respective software functions are implemented in multiple containers communicating with each rather than amalgamating all tools and workflows into a single software binary. Each of the design workflows 206, policy workflows 208, provisioning workflows 210, assurance workflows 212, and platform workflows 214 can be viewed as a set of related automation microservices to cover the design, policy authoring, provisioning, assurance, and cross-platform integration phases of the lifecycle of the access network 100.

The controller layer 220 can comprise subsystems for the management layer 202 and may include a network control platform 222, a network data platform 224, and an AAA platform 226. These controller subsystems can form an abstraction layer to hide the complexities and dependencies of managing many network elements and protocols. The network control platform 222 can provide automation and orchestration services for the network layer 230 and the physical layer 240, and can include the settings, protocols, and tables to automate management of the network and physical layers. In addition, the network control platform 222 can include tools and workflows for discovering switches, routers, wireless controllers, and other network devices; maintaining network and endpoint details, configurations, and software versions; Plug-and-Play (PnP) for automating deployment of network infrastructure, Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network nodes (e.g., endpoints, network devices, etc.) using Network Configuration (NETCONF)/ Yet Another Next Generation (YANG), a Restful State Transfer (REST) Application Programming Interface (API), REST on top of NETCONF/YANG (RESTCONF), Simple Network Management Protocol (SNMP), Syslog, Secure Shell (SSH)/Telnet or other Command Line Interface (CLI), and so forth. In some embodiments, the Cisco® Network Control Platform (NCP) can operate as the network control platform 222.

The network data platform 224 can provide for network data collection, analytics, and assurance, and may include the settings, protocols, and tables to monitor and analyze network infrastructure and endpoints connected to the access network 100. The network data platform 224 can collect multiple types of information from network devices, including system event (syslog) records, SNMP data, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 202, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA platform 226 can provide identity and policy services for the network layer 230 and physical layer 240, and may include the settings, protocols, and tables to support endpoint identification and policy enforcement services. The AAA platform 226 can provide tools and workflows to manage virtual networks and security groups, and to create group-based policies and contracts. The AAA platform 226 can identify and profile network devices and endpoints using AAA/RADIUS, 802.1X, MAC Authentication Bypass (MAB), web authentication, and EasyConnect, among others. The AAA platform 226 can also collect and use contextual information from the network control platform 222, the network data platform 224, and the shared services 250, among others. In some embodiments, Cisco® ISE can operate as the AAA platform 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay 234 may use any topology and routing protocol.

In some embodiments, the network management system 200 can provide a LAN automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane can translate user intent into network policy. That is, the fabric policy plane is where the network operator can instantiate logical network policy based on services offered by the network layer 230, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the Virtual Network Identifier (VNID) and Scalable Group Tag (SGT) fields in packet headers. The access network 100 can support both macro-segmentation and micro-segmentation. Macro-segmentation logically separates a network topology into smaller virtual networks by using a unique network identifier and separate forwarding tables. This can be instantiated as a Virtual Routing and Forwarding (VRF) instance and referred to as a Virtual Network (VN). That is, a VN is a logical network instance within the access network 100 defined by a Layer 3 routing domain and can provide both Layer 2 and Layer 3 services (using the VXLAN VNID to provide both Layer 2 and Layer 3 segmentation). Micro-segmentation logically can separate user or device groups within a VN, by enforcing source to destination access control permissions, such as by using Access Control Lists (ACLs). A scalable group is a logical object identifier assigned to a group of users, devices, or things in the access network 100. It can be used as source and destination classifiers in Scalable Group ACLs (SGACLs). The SGT can be used to provide address-agnostic group-based policies.

In some embodiments, the access fabric control plane device 110 may implement the LISP to communicate with one another and with the management cloud 102. Thus, the control plane nodes may operate a host tracking database, a map server, and a map resolver. The host tracking database can track the endpoints 130 connected to the access fabric 120 and associate the endpoints to the access fabric access layer devices 126, thereby decoupling an endpoint's identifier (e.g., IP or MAC address) from its location (e.g., closest router) in the access network 100.

The physical layer 240 can comprise physical network devices, such as wired switches and routers 110, 122, 124, and 126 and wireless network devices 108 and 128, and network appliances, such as the access fabric controller appliances 104, the AAA appliances 106, and physical network appliances (if any) of the shared services 250.

The shared services 250 can provide an interface to various network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services 250 using APIs.

Figure 3:
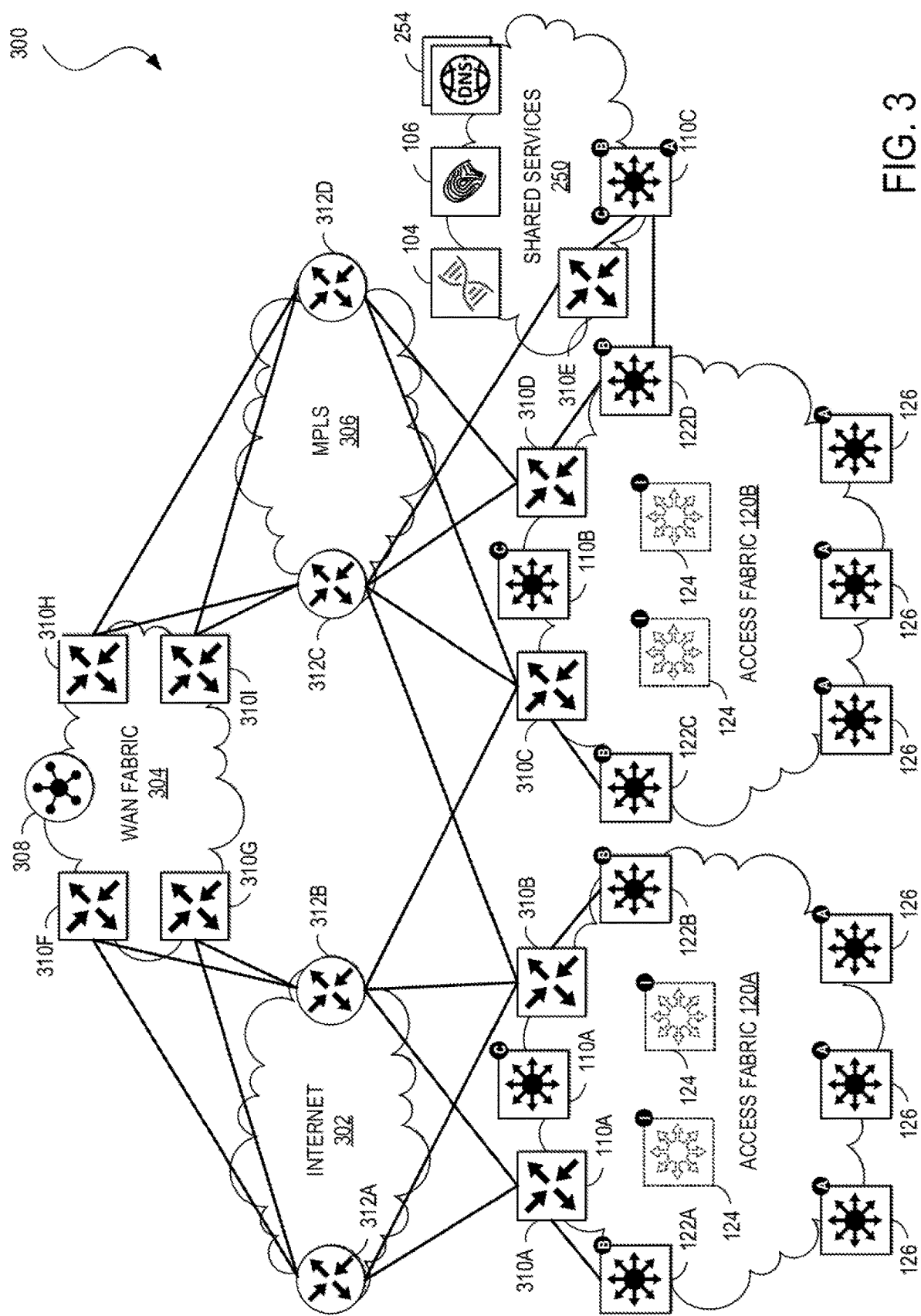
FIG. 3 illustrates an example of a multi-site access network in accordance with an embodiment.

FIG. 3 illustrates an example of a network 300 including a multi-site access comprising access fabrics 120A and 120B and the shared services 250 (collectively, 120). In this example, the access fabric 120A can connect to the access fabric 120B and the shared services 250 via WAN fabric 304, and the access fabric 120B and the shared services 250 can directly connect to one another via the access fabric border device 122D and the access fabric control plane device 110C. In other embodiments, the access fabric 120A may connect directly to the access fabric 120B and/or the shared services 250, the access fabric 120B may additionally or alternatively connect to the shared services 250 via the WAN fabric 304, and the access fabrics 120 may alternatively or additionally connect to one another via other transport networks. Each access fabric 120 can include or more access fabric control plane devices 110, access fabric border devices 122, access fabric intermediate devices 124, and access fabric access layer devices 126. In this example, the access fabric control plane device 122C can also operate as the access fabric border device 122 and the access fabric access layer device 126 for the shared services 250 within a single physical network device. In another embodiment, the access fabric border device 122D and the access fabric control plane device 110C can be a single physical network device.

The access fabric 120 can form a single fabric under common administrative control of an access fabric network controller, such as the access fabric controller appliance 104, but can be interconnected by one or more transport networks, such as one or more Internet Service Provider (ISP) networks, like Internet transport network 302 (e.g., Digital Subscriber Line (DSL), cable, etc.); a Multi-Protocol Label Switching (MPLS) service provider network or other private packet-switched network technology (e.g., Metro Ethernet, Frame Relay, Asynchronous Transfer Mode (ATM), etc.), like MPLS network 306; a mobile service provider network (e.g., Long-Term Evolution (LTE), 4th Generation (4G), 5th Generation (5G), 6th Generation (6G), etc.); or other WAN technology or WAN service provider network (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN); or other private circuit-switched network; small aperture terminal (VSAT) or other satellite network; etc.).

The access fabrics 120 can also be independent networks, and their respective network devices can be under administrative control of separate network controllers. For example, in other embodiments, an access fabric site can be a data center network whose network devices are under administrative control of a separate data center network controller (e.g., Cisco® Application Policy Infrastructure Controller (Cisco APIC™)) but the access fabric 120 can share at least one fabric access border device with the data center network to interconnect them.

As used herein, an access fabric transit area can be a network address space (e.g., LISP Routing Locator (RLOC) network address space, Cisco® SD-WAN Transport Locator (TLOC) network address space, Virtual Tunnel Endpoint Identifier (VTEP) network address space, etc.) of each access fabric 120 that may have its own access fabric control plane devices 110 and/or access fabric border devices 122 but does not have access fabric access layer devices 126. In addition, an access fabric transit area can share at least one access fabric border device 122 with each access fabric 120 that the access fabric transit area interconnects. Thus, the network address space between the access fabric border device 122D and the access fabric control plane device 110C and between the access fabric border devices 122A-D and the access fabric control plane device 110C and WAN fabric edge devices 310A-E can be examples of access fabric transit areas. In general, an access fabric transit area can connect the access fabrics 120 to the external world. There are several approaches to provide external connectivity, such as via a traditional IP network (e.g., the Internet transport network 302), a traditional WAN (e.g., the MPLS network 306), SD-WAN (e.g., the WAN fabric 304), or native connectivity (e.g., between the access fabric border device 122D and the access fabric control plane device 110C if the access fabric control plane device did not operate as the access fabric access layer device 126). Traffic across the access fabrics 120, and other types of sites, can use the control plane and data plane network address spaces of the access fabric transit area to provide connectivity between sites. The access fabric border devices 122 can operate as handoff points from the access fabrics 120 for delivery of traffic to other sites. The access fabric transit areas can include additional features. For example, if the access fabric transit area is a WAN, then features like performance routing may also be used. In some embodiments, to provide end-to-end policy and segmentation, the access fabric transit area may be capable of carrying endpoint context information (e.g., Virtual Local Area Networks (VLANs), Virtual Network Identifiers (VNIDs), Virtual Routing and Forwarding (VRF) instances, Virtual Private Networks (VPNs), Endpoint Groups (EPGs), Security Group Tags (SGTs), etc.). Otherwise, a re-classification of the traffic may be needed at the access fabric transit area.

In some embodiments, a local fabric access control plane device in each access fabric site may only hold state relevant to endpoints that are connected to access fabric access layer devices within a local access fabric site. The local fabric access control plane device can register local endpoints via local access fabric access layer devices, as with a single fabric site (e.g., the access fabric of FIG. 1). An endpoint that is not explicitly registered with the local fabric access control plane device may be assumed to be reachable via access fabric border devices connected to the access fabric transit areas. In some embodiments, local fabric access control plane devices may not hold state for endpoints attached to other access fabric sites such that access fabric border devices do not register information from the access fabric transit area. In these embodiments, a local fabric access control plane device can be independent of other access fabric sites to enable overall scalability of a network.

In some embodiments, an access fabric control plane device in an access fabric transit area can hold summary state for all access fabric sites that it interconnects. This information can be registered to an access fabric control plane device by access fabric border devices from different access fabric sites. Access fabric border devices can register local endpoints (e.g., LISP Endpoint Identifiers (EIDs)) from a local access fabric site into a local access fabric control plane device for summary EIDs only and thus further improve scalability.

The shared services 250 can also include one or more access fabric controller appliances 104, AAA appliances 106, and other shared network appliances (e.g., the DNS, DHCP, IPAM, and other shared network address management services 254; SNMP and other monitoring tools; NetFlow, syslog, and other data collectors, etc.). In other embodiments, the shared services 250 can reside outside of the access fabric 120 and in a global routing table (GRT) of an existing network. In these cases, some method of inter-VRF routing may be required.

The WAN fabric 304 includes a WAN fabric controller 308, WAN fabric edge devices 310F and 310G connected to provider edge devices 312A and 312B in the Internet transport network 302 and WAN fabric edge devices 310H and 310I connected to provider edge devices 312C and 312D. The WAN fabric controller 308 can establish secure connections to each WAN fabric edge device 310 and distribute route and policy information via a control plane protocol (e.g., Overlay Management Protocol (OMP), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the WAN fabric controller 308 can operate as a route reflector. The WAN fabric controller 308 can also orchestrate secure connectivity in between the WAN fabric edge devices 310. For example, in some embodiments, the WAN fabric controller 308 can distribute crypto key information among the WAN fabric edge devices 310. This can allow the WAN fabric 304 to support a secure network protocol or application (e.g., IP Security (IPSec), Transport Layer Security (TLS), Secure Shell (SSH), etc.) without Internet Key Exchange (IKE) and enable scalability of the WAN fabric. In some embodiments, physical or virtual Cisco® SD-WAN vSmart controllers can operate as the WAN fabric controller 308.

The WAN fabric edge devices 310 can operate within various sites associated with an organization, such as the access fabrics 120 and the shared services 250, and so forth, or in the cloud (e.g., Infrastructure as a Service (IaaS), Platform as a Service (PaaS), SaaS, and other cloud service provider networks). The WAN fabric edge devices 310 can provide secure connectivity among the sites or the cloud over one or more transport networks, such as the Internet transport network 302, the MPLS network 306, and so forth. The WAN fabric edge devices 310 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the WAN fabric edge devices 310.

Figure 4:
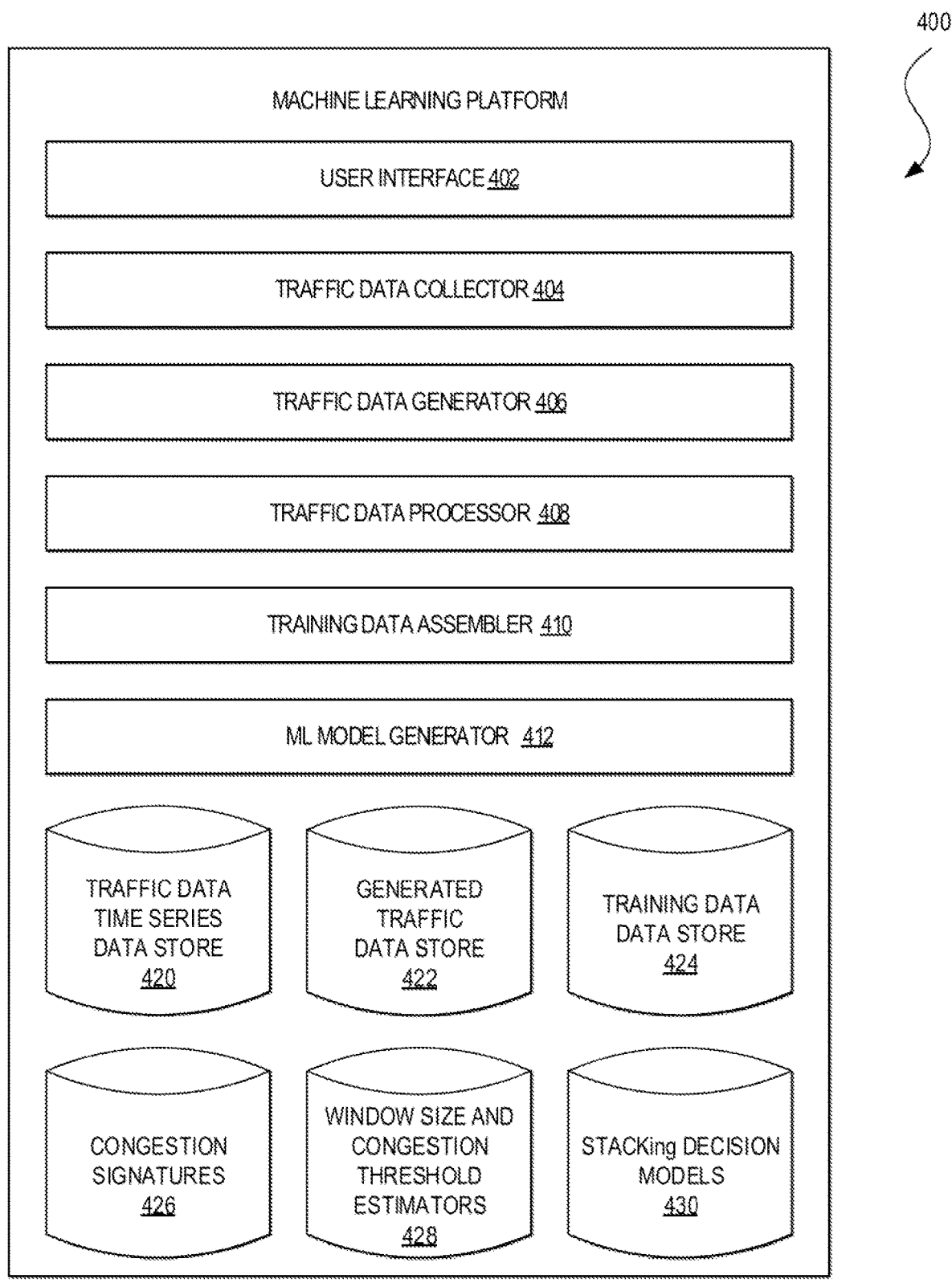
FIG. 4 illustrates an example of a machine learning platform in accordance with an embodiment.

FIG. 4 illustrates an example of a machine learning platform 400 for collecting and/or generating traffic data, processing the traffic data to generate data sets to provide as input to machine learners, assembling training data sets to provide as input to supervised machine learners, building machine learning models for analyzing a network (e.g., the access network 100) using the machine learners, and distributing the machine learning models to network nodes (e.g., the access fabric controller appliances 104, the WLCs 108, the access fabric control plane devices 110, the access fabric border devices 122, the access fabric intermediate devices 124, the access fabric access layer devices 126, the wireless access points 128, the endpoints 130, the shared services 250, the WAN fabric controller 308, the WAN fabric edge devices 310, etc.) to apply to new traffic data, among other operations. The machine learning platform 400 can be a part of the network management system 200 (e.g., the assurance workflows 212, the network control platform 222, the network data platform 224, etc.) or a stand-alone platform. Using this approach, network nodes having relatively limited hardware resources can nonetheless take advantage of the substantial resources available to the network management system 200 for performing tasks that may otherwise be intractable for the network nodes individually. An example of an implementation of the machine learning platform 400 is the Cisco® Artificial Intelligence (AI) Center.

In some embodiments, the machine learning platform 400 can generate one or more traffic class-specific congestion signatures to identify whether input traffic data (e.g., TCP segment, TCP flow, etc.) corresponds to a predetermined traffic class and predetermined state (e.g., a congested state). For example, given a flow of a known traffic class, a traffic class-specific congestion signature can determine whether the given flow corresponds to a congested state for that traffic class.

As another example, the machine learning platform 400 can generate one or more window size and/or congestion threshold estimators for determining a TCP window size and/or congestion threshold for input traffic data when the input traffic data corresponds to a predetermined traffic class and predetermined congestion state. For example, given a flow of a known traffic class and known congestion state, a window size and/or congestion threshold estimator can determine the current TCP window size and/or current congestion threshold for the given flow.

As yet another example, the machine learning platform 400 can generate one or more STACKing reinforcement learning agents for determining whether to perform STACKing for input traffic data (e.g., selective tracking of acknowledgments in a network device's main memory or on-chip memory instead of the device's interface buffers or off-chip memory). For example, given a flow, a STACKing reinforcement learning agent can determine whether initiating, continuing, or suspending STACKing for the flow maximizes a total reward (e.g., maximizes transmission throughput) or minimizes a total cost (e.g., minimizes network latency), and select the course of action that maximizes the total reward or minimizes the total cost. Other embodiments may include different numbers and/or types of machine learning models but one of ordinary skill the art will appreciate that such variations do not depart from the scope of the present disclosure.

In this example, the machine learning platform 400 includes a user interface 402, a traffic data collector 404, a traffic data generator 406, a traffic data processor 408, a training data assembler 410, and a machine learning model generator 412, and one or more data stores for storing the input data for the machine learning platform 400, such as a traffic data time series data store 420, the generated traffic data store 422, a data store for training data 424, and one or more data stores for storing the output data for the machine learning platform 400, such as a data store for traffic class-specific congestion signatures 426 to determine whether a given flow corresponds to a predetermined traffic class and predetermined congestion state, a data store for window size and congestion threshold estimators 428 to determine a current window size $W_{LATEST}$ and/or current congestion threshold $T_{LATEST}$ for a given flow of a predetermined traffic class and predetermined congestion state, and a data store for STACKing reinforcement learning agents 430 to determine whether a given flow is suitable for STACKing.

The traffic data collector 404 can capture network traffic data, such as packet traces, session logs, and performance metrics from different layers of the Open Systems Interconnection (OSI) model, the TCP/IP model, or other network model. The traffic data collector 404 can capture the traffic data at various levels of granularity, such as per datagram, unidirectional flow, or bidirectional flow (including TCP flows, connections, sessions, etc.), or other network data unit. For example, the traffic data collector 404 can capture traffic data of individual datagrams (e.g., datagram size, source address, source port, destination address, destination port, datagram type, protocol, TCP sequence number, TCP acknowledgment number, TCP flags, etc.); unidirectional flows (e.g., number of datagrams and aggregate size of datagrams having the same source address/port, destination address/port, protocol type, class of service, router/switch interface, etc., total number of unidirectional flows, unidirectional flows per second, etc.); bidirectional flows, connections, sessions (e.g., byte or datagram rate, bytes or datagrams received, bytes or datagrams sent, window size, flow control threshold, etc.); groups of flows (e.g., flow data for flows associated with a certain user or group, ACL, application, or other traffic class, etc.); and other network data units. Table 1 shows an example of the types of network data units and features of the network data units that the traffic data collector 404 can capture.

TABLE 1

Examples of Network Traffic Data Units and Features

| DATA UNIT | EXAMPLES OF FEATURES |
| --- | --- |
| Datagram | Protocol, length, Time To Live (TTL), source address, source port, destination address, destination port, TCP flags, content type (e.g., text, binary, encrypted, etc.), timestamp |
| Unidirectional Flow | Protocol, address, source port destination address, destination port, flow duration, content type, flow volume in bytes and datagrams, datagram or flow statistics (minimum, mean, maximum, standard deviation, etc., of duration, volume, datagram inter-arrival times, etc.) |
| Bidirectional Flow; TCP Flow; TCP Connection; TCP Session | Application, protocol, source address, source port, destination address, destination port, duration, volume in bytes and datagrams, statistics (minimum, mean, maximum, standard deviation, etc., of RTTs, duration, volume, etc.) |

The traffic data generator 406 can generate simulated traffic that the training data assembler 410 can use to construct training data from which the machine learning model generator 412 can build machine learning models. The traffic data generator 406 can generate traffic at various levels of granularity, including frame-level, packet-level, flow-level, stream-level, application-level, and system-level. Frame-level and packet-level generators can create single frames or packets, respectively, having specified characteristics (e.g., protocol, source, destination, size, etc.). Flow-level generators can produce bursts of packets having specified traffic qualities (e.g., volume, packet inter-arrival times). Stream-level generators can be similar to flow-level generators but can simulate bi-directionality. Application-level generators can simulate application specific behaviors. System-level generators can simulate traffic for an entire network. Table 2 sets forth examples of implementations of network traffic generators of various levels of granularity.

TABLE 2

Examples of Traffic Generators

| Type | Name | Description |
| --- | --- | --- |
| Frame-level generator | packETH | A tool for creating Ethernet frames and IP packets |
| Packet-level generator | ipgen | Raw socket programming tool for transmitting TCP, User Datagram Protocol (UDP), or ICMP packets |
| Packet-level generator | Packet Generator | A libnet based tool for creating custom packets |
| Packet-level | Pktgen-DPDK | Data Plane Development Kit (DPDK) based packet generator |
| Packet-level generator | MoonGen | DPDK based packet generator |
| Packet-level | pkt-gen | A netmap based packet generator |
| Packet-level | pfq-gen | A Packet Family Queue (PFQ) based packet generator |
| Packet-level | zsend | PF_RING ZC packet generator |
| Flow-level | Multi-Generator (MGEN) | Flow-level generator supporting different distributions of packet inter-arrival times and sizes |
| Flow-level | Realtime UDP (RUDE)/Collector for RUDE (CRUDE) | Data Emitter Kernel-level UDP flow generator |
| Flow-level | Iperf | User-level application for bandwidth, packet loss ratio, and jitter testing |
| Flow-level | netperf | User-level application for simulating bulk data transfers |
| Flow-level | Brawny and Robust Traffic analysis (BRUTE) | Kernel-level flow generator |
| Flow-level | BRUTE on Network Processor | Hardware implemented flow generator (BRUNO) |
| Flow-level | Kernel-based Traffic analysis (KUTE) | Kernel-level flow generator |
| Flow-level | Traffic Generator (TG) | Flow generator supporting different distributions of packet inter-arrival times and sizes |
| Flow-level | mxtraff | User-level application that can create TCP and UDP streams to emulate mice (e.g., small, intermittent TCP flows), elephants (e.g., large, continuous TCP flows), and dinosaurs (e.g., constant and continuous UDP flows) |
| Stream-level | Harpoon | Flow-based generator that can replicate NetFlow based measurements |
| Stream-level | Distributed Internet Traffic Generator (D-ITG) | Workload generator for various network scenarios |
| Stream-level | Netspec | Distributed system for generating traffic; offers synchronized set of flow-level generators for emulating stream-level behavior |
| Application-level | Tmix | Traffic emulator for n2 based on source-level TCP connections |
| Application-level | Ostinato | User-level flow generator |
| Application-level | TCPreplay | User-level application for replaying libpcap files |
| Application-level | TCPivo | Kernel-level replay engine |
| Application-level | ParaSynTG | Web traffic generator |
| Application-level | Scalable URL Reference Generator (SURGE) | HTTP workload generator |
| Application-level | YouTube ® Workload Generator | Workload generator for video traffic |
| Application-level | LiTGen | Statistically models IP traffic resulting from web requests on a user and application basis |
| System-level | Swing | Traffic generator that can replicate user, application, and network behavior corresponding to real traffic measurements |
| System-level | Scalable and flexible Workload Distributed Data processing systems (SWORD) | Uses decision trees to simulate various types of generator for communications, including voice |

The traffic data processor 408 can prepare the traffic data captured by the traffic data collector 404 and traffic data generator 406 for input into downstream components of the machine learning platform 400, such as the training data assembler 410 or the machine learning model generator 412. The traffic data processing tasks can include data cleansing, aggregation, filtration, data type conversion, normalization, discretization, other transformations, and feature extraction, among others. Data cleansing can involve tasks for handling missing values (e.g., ignoring data points having missing feature values, substituting missing values with dummy values, mean, mode, median, etc.), duplicate values or redundant or insignificant data (e.g., deleting or aggregating duplicate or redundant or insignificant data), and outliers or noise (e.g., binning, regression, deletion, etc.), among other irregularities.

Aggregation can involve constructing units of data at a specified level of granularity from traffic data, such as building packets into segments, segments into application layer protocol messages (e.g., unidirectional flows, requests, or responses), messages into connections (e.g., bidirectional flows or request/response pairs), connections into sessions, and so forth. Filtration can involve removing extraneous or duplicative data from traffic data. For example, in some embodiments, the traffic data processor 408 can eliminate small flows of short duration that never progress beyond slow start (e.g., less than 10 segments). Data type conversion can involve mapping raw data from one data type to another. For example, raw data may include numeric data and categorical data (e.g., the protocol of a packet can take values such as TCP, ICMP, Telnet, UDP, etc.). Some machine learning techniques may work with either numeric data or categorical data but not both. Thus, in some embodiments, the traffic data processor 408 can convert raw data to a form usable with a particular machine learning model (e.g., converting numeric data to categorical data or vice versa).

Normalization can involve equalizing or reweighting feature values to reflect their relative importance. For example, not all parameters or feature values may be of equal importance, or their value ranges may be highly variable. In some embodiments, the traffic data processor 408 can equalize, reweight, or otherwise adjust traffic data. Discretization can involve transforming continuous values into discrete values. For example, traffic data may have continuous valued attributes such as the number of packets, the number of bytes, and the duration of a session. In some embodiments, the traffic data processor 408 can convert continuous valued attributes into distinct binary values or ranges. Other types of transformations can include generalization (e.g., converting specific feature values to less specific feature values), rescaling (e.g., standardization, min-max scaling, etc.), non-linear transformations (e.g., mapping feature values to a uniform distribution, Gaussian distribution, etc.), compression/decompression, encryption/decryption, and so on.

Feature extraction can extract the discriminative characteristics of traffic data. A feature is generally a quality of a network data unit that can distinguish it from other network data units. Some examples of features for network traffic data include packet header or flow fields, such as a source address, source port, destination address, destination port, protocol type, or class of service, among others; content-based features (e.g., features within the payload, such as specific tokens or words in the payload); time-based features (e.g., round-trip time (RTT), Inter-Arrival Time (IAT) for request/response pairs, number of connections to the same host during a time interval, etc.); and connection- or session-based features (e.g., number of packets, number of bytes, number of flows, bandwidth utilization, latency, packet loss, jitter, error, etc.).

The training data assembler 410 can generate training data sets from a large collection of traffic data processed by the traffic data processor 408 and captured by the traffic data collector 404 over a period of time (e.g., days, weeks, months, etc.) or generated by the traffic data generator 406 to provide as input to machine learners. Machine learning is a field of computer science that uses statistical techniques to give computer systems the ability to learn or progressively improve performance on a specific task without being explicitly programmed. Machine learning can sometimes be categorized as supervised learning, unsupervised learning, semi-supervised learning, and reinforcement learning. Supervised machine learning can involve determining a model or a function that maps an input (e.g., a sample or a data point, such as a TCP datagram or TCP flow) to an output from exemplar input-output pairs typically referred to as a training data set. When the output is a discrete value (sometimes also referred to as a label, category, class, etc.), the learning task may be referred to as classification. When the output is a continuous value (e.g., a range of values), the learning task may be referred to as regression.

Supervised machine learning can comprise multiple phases, including a learning phase or a training phase in which a machine learning model (e.g., a classifier or a regression model) can be constructed from the training data points and their labels, and an evaluation phase in which the machine learning model can be utilized to determine a label for a new, unlabeled data point. In some embodiments, a network device can apply the traffic class-specific congestion signatures 426 to determine whether a given flow corresponding to a predetermined traffic class is in a predetermined congestion state. To generate a training data set for a traffic class-specific congestion signature 426, the traffic data collector 404 can collect or the traffic data generator 406 can create traffic data for a period of time, the traffic data processor 408 can process the traffic data, and the training data assembler 410 can label a portion of the processed traffic data that correspond to the predetermined traffic class and predetermined congestion state. In some cases, the training data assembler 410 can also label the remaining portion of the traffic data as not corresponding to the predetermined traffic class and predetermined congestion state depending on the machine learning algorithm. The training data assembler 410 can extract the minimum, maximum, and CV of RTTs sampled during RTT sampling periods for flows corresponding to the predetermined traffic class and predetermined congestion state (and, in some cases, flows not corresponding to the predetermined traffic class and predetermined congestion state) to generate the training data set for the traffic class-specific congestion signatures 426.

In some embodiments, a network device may apply the window size and congestion threshold estimators 428 to determine a current window size $W_{LATEST}$ and/or current congestion threshold $T_{LATEST}$ of a given flow corresponding to a predetermined traffic class and predetermined congestion state. To generate a training data set for a traffic class-specific window size and/or congestion threshold estimator 428, the training data assembler 410 can extract the minimum, maximum, and CV of RTTs sampled during RTT sampling periods for flows corresponding to the predetermined traffic class and predetermined congestion state. The training data assembler 410 can utilize the same set of traffic class-specific flows used to generate a corresponding traffic-class specific congestion signature 426, or the training data assembler may apply the corresponding traffic class-specific congestion signature 426 to second traffic data collected or generated over a second period of time to identify traffic class-specific flows corresponding to the predetermined congestion state.

The training data assembler 410 can determine the window size W and/or congestion threshold T for the traffic class-specific flows corresponding to the predetermined congestion state. For example, the training data assembler 410 can determine the window size W of a flow as the estimated size of the congestion window (cwnd) and the congestion threshold T of the flow as the estimated slow start threshold (ssthresh) at the end of an RTT sampling period. The training data assembler 410 can also determine $ACK_{BYTES}$ for the traffic class-specific flows corresponding to the predetermined congestion state. $ACK_{BYTES}$ can be a cumulative value or an instant value depending on the size of the RTT sampling period.

The machine learning model generator 412 can build machine learning models for analyzing traffic data using supervised learning methods, such as Naïve Bayes classifiers, linear regression, logistic regression, polynomial regression, K Nearest Neighbors (K-NN), Support Vector Machines (SVMs), decision trees, random forests, boosting, and neural networks, among others. Naive Bayes classifiers comprise a set of classifiers based on Bayes' theorem of conditional probability or the probability of a class 'c' given a set of feature values 'x':

$$P(c|x) = \frac{P(x|c)P(c)}{P(x)}, \quad \text{(Equation 1)}$$

where P(c|x) can represent the posterior probability of the class 'c' or the probability of the 'c' class given 'x' feature values, P(x|c) can represent the likelihood or the probability of 'x' feature values given the class 'c', P(c) can represent the prior probability of 'c' or the probability of class 'c' in the training data set, and P(x) can represent the prior probability of the 'x' feature values in the training data set. These classifiers may be characterized as naive because they assume that each feature is independent from one another for simplifying the calculation of P(x|c). The naive Bayes probability model can be combined with a decision rule for classification, such as a Maximum A Posteriori (MAP) rule, that classifies a data point based on a class having the greatest probability among the possible classes. Different types of naive Bayes classifiers may use different assumptions regarding the distribution of P(x|c), such as a Gaussian distribution, a multinomial distribution, or a Bernoulli distribution, among others.

Linear regression is used to explore the extent to which a variable or a set of variables (also called independent, predictor, or explanatory variables) may predict a dependent variable (also called the response, outcome, or target). Linear regression can also provide results in terms of the significance of the predictor variables as well as the magnitude (estimated coefficient value) and sign of relationship (e.g., negative or positive estimated coefficient sign). Linear regression techniques are used to create a linear model. The model can describe the relationship between a dependent variable (also called the response, outcome, or target) as a function of one or more independent variables (also called the predictor or explanatory variable). The linear regression model can describe the dependent variable with a straight line that is defined by the equation:

$$y=\beta_0+\beta_1 x+\varepsilon, \quad \text{(Equation 2)}$$

where y can represent the dependent variable, x can represent the independent variable, $\beta_0$ can represent the slope, Pi can represent the y-intercept, and $\varepsilon$ can represent the error term. Using observed values of x and y, the parameters $\beta_0$ and $\beta_1$ and $\varepsilon$ of the regression line can be estimated from the values of the dependent variable y and the independent variable x with the aid of statistical methods. The regression line enables prediction of the value of the dependent variable y from that of the independent variable x. The slope $\beta_0$ of the regression line is called the regression coefficient. It can provide a measure of the contribution of the independent variable x toward explaining the dependent variable y. The method of least squares can be used to estimate $\beta_0$ and $\beta_1$. That is, $\beta_0$ and $\beta_1$ can be estimated so that the sum of the squares of the differences between the observations y and the straight line is a minimum.

The response y can be influenced by more than one predictor variable. A multiple or multivariable linear regression model can study the effect of multiple independent variables on the dependent variable. In the multiple linear regression model, the dependent variable is described as a linear function of the independent variables $x_i$:

$$y=\beta_0+\beta_1 x_1+\beta_2 x_2+\ldots+\beta_1 x_1+\varepsilon, \quad \text{(Equation 3)}$$

The estimated coefficients $\beta_i$ can be interpreted as conditional on the other variables. That is, each $\beta_i$ can reflect the predicted change in y associated with a one-unit increase in $x_i$ that is conditional upon the rest of the other the independent variables $x_i$. This type of model can be used for more complex relationships between three or more variables.

A logistic regression model may rely on a logistic function (e.g., sigmoid function, s-curve, etc.) to represent the relationship between dependent and independent variables. In particular, logistic regression can model the log odds of p or the logit of p as a linear combination of the feature values $x_n$:

$$\text{logit}(p) = \log\left(\frac{p}{1-p}\right) = \beta_0 + \beta_1 x_1 + \ldots + \beta_n x_n, \quad \text{(Equation 4)}$$

where p/(1−p) can represent the odds of the occurrence of an event, $\beta_0 \ldots \beta_n$ represent coefficients of the logit function, and $x_1 \ldots x_n$ can represent the feature values. Logistic regression can involve finding the values of the coefficients $\beta$ that best fits the training data, such as by using Maximum Likelihood Estimation (MLE). Probability can then be derived from:

$$p = \frac{e^{logit}}{1+e^{logit}} = \frac{1}{1+e^{-logit}} \quad \text{(Equation 5)}$$

Logistic regression models can be binomial (e.g., zero or one, class or not the class, etc.), multinomial (e.g., three or more unordered classes), or ordinal (e.g., three or more ordered classes).

A polynomial regression model can fit a nonlinear data space to represent the relationship between a dependent variable and independent variables. The polynomial regression model can take the form:

$$y=\beta_0+\beta_1 x_1+\beta_2 x_2^2+\beta_3 x_3^3+\ldots+\beta_n x_n^n+\varepsilon, \quad \text{(Equation 6)}$$

A polynomial can have any number of terms (called the degree of the polynomial). For each degree of the polynomial, each independent variable $x_i$ can be multiplied by some parameter $\beta_i$, and $x_i$ can be raised to the power n. A straight line is considered a polynomial of degree 1, a quadratic polynomial is considered a polynomial of degree 2, a cubic polynomial is considered a polynomial of degree 3, and so on. A property of a polynomial regression model is that nearly any shape can be described by a polynomial of sufficient degree, within a limited range of values.

In a nearest neighbor classification or regression, the top K nearest neighbors to an unlabeled data point can be identified from the training data. The class label or continuous value with the largest presence among the K nearest neighbors can be designated as the class label or continuous value for the unlabeled data point. In some embodiments, training data points may be aggregated for improving classification. For example, small clusters can be determined from the instances of each class, and the centroid of each cluster may be used as a new instance. Such an approach may be more efficient and more robust to noise. Other variations may use different similarity (or distance) functions, such as the Minkowski distance or the Mahalanobis distance.

The Minkowski distance may be appropriate where feature vectors are independent and each feature vector is of equal importance. For example, if D is the distance between feature vectors v and w, and $f_i(x)$ is the number of features in a bin i of x, the Minkowski distance can be defined as:

$$D(v,w) = (\Sigma_i |f_i(v) - f_i(w)|^p)^{1/p}, \quad \text{(Equation 7)}$$

where p=1 is the $L_1$ distance (also sometimes called the Manhattan distance), p=2 is the $L_2$ distance (also known as the Euclidean distance), and p=∞ is the $L_\infty$ distance (also called the Chebyshev distance).

The Mahalanobis distance may be appropriate when each dimension of the feature vector is dependent of each other and is of different importance. The Mahalanobis distance can be defined as:

$$D(v,w) = \sqrt{(\mathcal{F}_v - \mathcal{F}_w)^T C^{-1} (\mathcal{F}_v - \mathcal{F}_w)} \quad \text{(Equation 8)}$$

where C is the covariance matrix of the feature vectors v and w, $\mathcal{F}$ v and $\mathcal{F}$ w are vectors that list all the feature values in $f_i(v)$ and $f_i(w)$.

Other similarity (or distance) measures that can also be used include the cosine similarity, Jaccard coefficient, the Pearson correlation coefficient, and the averaged Kullback-Leibler divergence, among others. Some embodiments may also use various indexing structures or techniques for efficiently searching the feature set space, including multi-dimensional hashing, which can map features into fix-sized bins or buckets based on some function applied to each feature; locality sensitive hashing, which can use unions of independently computed hashing functions to index features; or multi-dimensional search trees, such as k-d trees, which can divide the multi-dimensional feature space along alternating axis-aligned hyper-planes to maximize search tree balance; among other approaches.

Support vector machines may be constructed by finding the linear conditions (referred to as a hyper-plane) that best separate classes from one other. Generating an SVM can involve plotting data points in n-dimensional space (where n is the number of features of the data points), identifying the hyper-planes that differentiate classes, and maximizing the distances (referred to as the margin) between the data points of the classes. In other words, an SVM classifier may identify the maximum margin hyper-plane from the training data set. The method of SVM classification can be extended to solve regression problems or Support Vector Regression (SVR).

A decision tree may be created from a data set in which each node of the tree can correspond to one or more features, and a branch or edge from the node to a child node can correspond to the possible values of the features. Each leaf can represent a class label whose feature values satisfy the specified ranges of the path from the root of the tree to the leaf. The partitioning at each level of the tree can be based on a split criterion, such as a condition or rule based on one or more features. Decision trees try to recursively split the training data so as to maximize the discrimination among different classes over different nodes of the tree. Decision tree algorithms may differ on how to select the splitting features and how to prune the tree when it becomes too large. Some examples of decision trees include Iterative Dichotomizer 3 (ID3), C4.5, Classification and Regression Tree (CART), and Chi-squared Automatic Interaction Detector (CHAD), among others.

Random forests may rely on a combination of decision trees in which each tree may depend on the values of a random vector sampled independently and with the same distribution for all trees in the forest. A random forest can be trained for some number of trees T by sampling N cases of the training data at random with replacement to create a subset of the training data. At each node, a number M of the features can be selected at random from the set of all features. The feature that provides the best split can be used to do a binary split on that node. At the next node, another number M of the features can be selected at random and the process can be repeated.

Boosting attempts to identify a highly accurate hypothesis (e.g., low error rate) from a combination of many weak hypotheses (e.g., substantial error rate). Given a data set comprising data points within a class and not within the class and weights based on the difficulty of classifying a data point and a weak set of classifiers, boosting can generate and call a new weak classifier in each of a series of rounds. For each call, the distribution of weights may be updated to reflect the importance of the data points in the data set for the classification. On each round, the weights of each incorrectly classified data point can be increased, and the weights of each correctly classified data point can be decreased so the new classifier can focus on the difficult data points (i.e., those data points that have not been correctly classified). Some examples of boosting methods include Adaptive Boosting (AdaBoost), Gradient Tree Boosting, and XGBoost, among others.

Neural networks are inspired by biological neural networks and can comprise an interconnected group of functions or classifiers that process information using a connectionist approach. The basic units of a neural network can be neurons (or perceptrons) that are connected to one another based on weights representing the strength of the connection between the units. A neural network can take input data from a set of dedicated input neurons and deliver its output to a set of dedicated output neurons. However, a neuron can generally operate as both an input unit and/or an output unit. For classification, a neural network can be characterized by the model of the neuron (e.g., binary threshold unit, linear threshold unit, linear unit, sigmoidal unit, distance unit, radial basis unit, polynomial unit, Gaussian unit, etc.), its net value function (e.g., the unit's parameters or weights to summarize input data), and its activation function (e.g., how the unit may transform the net value into an output value); the architecture or the topology connecting the neural network (e.g., single-layer network, multi-layer network, network with feedback, etc.); the data encoding policy defining how input data (e.g., feature vector) or class labels are represented in the neural network, and the training algorithm used to determine the optimal set of weights associated with each unit (e.g., Hebbian rule, delta rule, etc.). Examples of neural networks can include the multilayer neural network, the auto associative neural network, the probabilistic decision-based neural network (PDBNN), and the sparse network of winnows (SNOW), among others.

Numerous other types of machine learning algorithms may be used in other embodiments, including other classification algorithms, such as Linear Discriminant Analysis (LDA), Quadratic Discriminant Analysis (QDA), and Learning Vector Quantization (LVQ), among others; other regression algorithms, such as kernel ridge regression, Bayesian linear regression, non-parametric regression, and so on; or other algorithms that can be used for both classification or algorithm, such as Stochastic Gradient Descent (SGD) classification or regression, Gaussian Process Classification (GPC) or Gaussian Process Regression (GPR), Gradient Tree boosting classification or regression, and so forth.

In some embodiments, the machine learning model generator 412 can generate reinforcement learning agents for determining whether to take certain actions to improve network operations. Reinforcement learning is a type of machine learning that uses a trial and error approach to progress toward a user-defined objective. A reinforcement learning system can achieve its objective through a learning agent capable of sensing a state of its environment and selecting an action to perform that can change the environment in some way. Upon performing the action, the system can communicate to the learning agent the change to the environment (e.g., a transition from one state of the environment to another state of the environment) due to the action, and an indicator of whether the state transition and/or action was correct or incorrect (e.g., a reward). The behavior of the learning agent or the mapping of state to action is referred to as a policy, and it is generally the objective of the reinforcement learning system to determine an optimal policy or the actions to take to maximize a total reward (or minimize a total cost) over a time period (e.g., from an initial state to an end state).

Various approaches can be used to learn or approximate the optimal policy, and a common approach can involve determining or approximating optimal value functions, including the optimal state-value function (e.g., a function that assigns to each state the largest expected return or total amount of reward accumulated over the future, starting from that state) and the optimal action-value function or optimal Q-value function (e.g., a function that assigns to each state-action pair the largest expected return, or total amount of reward accumulated over the future, for a given state and a given action). An optimal policy can be derived using a greedy policy that selects actions having the highest Q-value for each state. An example algorithm for determining the optimal Q-value function is Q-learning, which can involve iteratively updating Q-values for each state-action pair (e.g., taking an action, receiving a reward and state transition, updating Q-values with the reward and largest expected return, and repeating until transitioning to an end state) for each time step over a time period until convergence with the optimal Q-value function.

Some reinforcement learning agents can be modeled as Markov Decision Processes (MDPs). The MDP is a discrete time stochastic control process that can be defined by a tuple $\{S, A, P, R\}$, where S is a set of possible states of the environment, A is a set of possible actions, $P: S \times A \times S \rightarrow [0,1]$ is the state transition probability function, and $R: S \times A \times S \rightarrow \mathbb{R}$ is the reward function. At each time step t, $s_t \in S$ describes the state of the environment. The agent can alter the state at each time step by taking actions $a_t \in A$. As a result of the action $a_t$, the environment changes its state from $s_t$ to some $s_{t+1} \in S$ according to the state transition probabilities given by P: the probability of ending up in state $s_{t+1}$ given that action $a_t$ is performed at state action $s_t$ is $P(s_t, a_t, s_{t+1})$. The agent receives a scalar reward $r_{t+1} \in \mathbb{R}$, according to the reward function R: $r_{t+1} = R(s_t, a_t, s_{t+1})$. This reward evaluates the immediate effect of action $a_t$ (i.e., the transition from the state $s_t$ to the state $s_{t+1}$). The behavior of the agent can be described by its policy $\pi$, which is typically a stochastic function, $\pi: S \times A \rightarrow [0,1]$. The goal of the MDP (and other reinforcement learning systems) can be to maximize, at each time step t, the expected discounted return $G_t = \sum_{k=0}^{\infty} \gamma^k R_{t+k+1}$, where $\gamma \in [0,1)$ is a discount factor (e.g., a floating point number between 0 and 1 in which future rewards are given greater weight the closer $\gamma$ is to 1 and less weight the closer $\gamma$ is to 0). This can involve determining the optimal value function or the value function that returns a higher value than other functions for all states:

$$V^*(s) = \max_{\pi} V_{\pi}(s)$$

for all $s \in S$, or the optimal action-value function:

$$Q^*(s, a) = \max_{\pi} Q_{\pi}(s, a)$$

for all $s \in S$ and for all $a \in A$. That is, the optimal value of taking an action a for a state s is the expected immediate reward plus the expected return (e.g., the expected discounted optimal value attainable from the next state). A greedy policy is deterministic and can pick the action with the highest Q-value for every state: $\pi^*(s) = \arg\max_a Q^*(s,a)$. The agent can achieve the learning goal by first computing Q* and then selecting actions by the greedy policy, which is optimal (i.e., maximizes the expected return) when applied to Q*. Some examples of approaches for finding the optimal value function or the optimal action-value function include dynamic programming, value iteration, Q-learning, advantage learning, temporal differencing, among others.

The generalization of the MDP to the multi-agent case is the Stochastic Game (SG), which can be represented by a tuple $\{S, A_1, \ldots, A_n, P, R_1, \ldots, R_n\}$, where n is the number of agents, S is a set of possible states of the environment, $A_1, \ldots, A_n$ are sets of possible actions of each agent yielding the joint action set $A = A_1 \times \ldots \times A_n$, $P: S \times A \times S \rightarrow [0,1]$ is the state transition probability function, and $P_i: S \times A \times S \rightarrow \mathbb{R}$, where $i=1, \ldots, n$ are the reward functions of each agent. In the multi-agent case, the state transitions are the result of the joint action of all the agents, $a_t = [a_{1,t}^T, \ldots, a_{n,t}^T]$, where $a_t \in A$, $a_{i,t} \in A_i$ and T is the transpose of the vector. Consequently, the rewards $R_{i,t+1}$ and the returns $G_{i,t}$ also depend on the joint action. The policies $\pi_i: S \times A \rightarrow [0,1]$ form the joint policy $\pi$, and the Q-values of each agent can depend on the joint action and may be conditioned on the joint policy, $Q_i^{\pi}: S \times A \rightarrow \mathbb{R}$. If $\pi_1 = \ldots = \pi_n$, then all the agents have the same goal of maximizing the same expected return, and the SG is fully cooperative. If $n=2$ and $\pi_1 = -\pi_2$, then the two agents have opposite goals, and the SG is fully competitive. Mixed SGs are neither fully cooperative nor fully competitive. Some examples of approaches for determining the optimal value function or the optimal value-action function for fully cooperative SGs include Joint Action Learners (JAL), Frequency Maximum Q-Value (FMQ), Team Q-learning, Distributed Q-learning, and Optimal Adaptive Learning (OAL), among others. An example of determining the optimal value function or the optimal value-action function for a fully competitive SG includes Minimax Q-learning. Some examples of determining the optimal value function or the optimal value-action function for mixed SGs include Correlated Equilibrium (CE) Q-learning, Nash Q-learning, Non-Stationary Converging Policies (NSCP), and Asymmetric Q-learning, among others.

In some embodiments, the machine learning model generator 412 can construct the traffic class-specific congestion signatures 426 using classification techniques. As discussed above, a training data set for the traffic class-specific congestion signatures 426 can comprise a collection of flows labeled as corresponding to a predetermined traffic class and predetermined congestion state (and, in some cases, labeled as not corresponding to the predetermined traffic class and predetermined congestion state) along with the minimum, maximum, and CV of RTTs sampled during RTT sampling periods for the flows. The machine learning model generator 412 can provide the training data set as input to a classification algorithm (e.g., Naïve Bayes classifiers, logistic regression, K-NN, SVM, decision tree, random forest, boosting, neural network, etc.) to identify a function or a mapping based on the minimum, maximum, and CV of RTTs to the predetermined congestion state. The predetermined congestion state can be binary, such as congested or not congested, or a multi-class state corresponding to different levels of network congestion.

In some embodiments, the machine learning model generator 412 can construct the traffic class-specific window size and/or congestion threshold estimators 428 using polynomial regression. As discussed above, a training data set for the traffic class-specific window size and/or congestion threshold estimators 428 can comprise a collection of flows corresponding to the predetermined traffic class and predetermined congestion state along with the minimum, maximum, and CV of RTTs sampled during RTT sampling periods, the window size W and/or congestion threshold T, and the number of acknowledged bytes $ACK_{BYTES}$ at the end of the RTT sampling periods. For each traffic class, the machine learning model generator 412 can identify a polynomial function that best fits the training data set for that traffic class to create a window size and/or congestion threshold estimator 428. The polynomial function can comprise a single dependent variable (e.g., the window size W or the congestion threshold T) or multiple dependent variables (e.g., both the window size W and the congestion threshold T) and multiple independent variables based on the minimum, maximum, and CV of RTTs sampled during the RTT sampling periods and $ACK_{BYTES}$. For example, the independent variables can comprise the minimum, maximum, and CV of RTTs and $ACK_{BYTES}$ as separate variables, a combination of multiple independent variables (e.g., the difference of the maximum and minimum RTTs as a single independent variable), transformations of the independent variables (e.g., normalizing the difference of the maximum and minimum RTTs by dividing the difference by the maximum RTT), and so on.

In some embodiments, the machine learning model generator 412 can construct the STACKing reinforcement learning agents 430 as generalized MDPs or fully cooperative SGs with each traffic class (and congestion state) represented by a learning agent whose common goal is to achieve overall throughput (e.g., throughput across all traffic classes) as close as possible to network capacity (e.g., the capacity of the bottleneck link $BL_{CAP}$) without packet loss or not exceeding a packet loss threshold. Alternatively or in addition, the goal or goals of the learning agents can be to minimize latency, packet loss, jitter, error, and so forth. In other embodiments, the STACKing reinforcement learning agents 430 can correspond to different network objects (e.g., a STACKing reinforcement learning agent 430 per network device, per virtual network segment, per flow, etc.).

The machine learning model generator 412 can define the state space S of each STACKing reinforcement learning agents 430 to comprise at least one of a current window size W or a congestion threshold T. The machine learning model generator may alternatively or additionally define additional parameters for each STACKing reinforcement learning agents 430, such as set forth further below with respect to Tables 6 and 9. The machine learning model generator 412 can define an action space A for each learning agent as the transitions from one (valid state) to another (e.g., doing nothing, increasing a window size, congestion threshold, transmission rate, or other parameter; decreasing the window size, congestion threshold, transmission rate, or other parameter; etc.). The machine learning model generator 412 can define the probability P of transitioning from one state to another equally among the valid states. In some embodiments, the machine learning model generator 412 can define the reward function R for each learning agent as the extent to which an action $A_i$ increases overall throughput (e.g., throughput across all traffic classes) as close as possible to network capacity (e.g., the capacity of the bottleneck link $BL_{CAP}$) without packet loss or not exceeding a packet loss threshold. In other embodiments, the machine learning model generator 412 can define the reward function R based on the extent to which RTT increases as the window size W increases. For example, RTT can operate as a proxy for congestion. If the window size W increases above the congestion threshold T, and that action increases RTT, then the STACKing reinforcement learning agent can receive a negative reward. On the other hand, if the window size W increases without increasing RTT or without increasing RTT above a minimum threshold, then the STACKing reinforcement learning agent can receive a positive reward. Thus, the reward function can operate to increase the window size W up to the point of increasing congestion.

The user interface 402, which may be integrated with the user interface 204 in some embodiments, can enable a user to build and deploy machine learning workflows. The user interface 402 can implement a pipeline model that abstracts the machine learning workflow as one or more Directed Acyclic Graphs (DAGs). Each node can represent a self-contained set of user code that performs one step in the machine learning pipeline. For example, individual nodes can each be responsible for data preprocessing, data transformation, model training, and so on. When a user runs a pipeline, the machine learning platform 400 can launch compute instances (e.g., virtual machines, containers, etc.) to run the user code within each node. Some example implementations of the user interface 402 include KUBEFLOW, MLFLOW, AIRFLOW, and PACHYDERM, among others.

Figure 5:
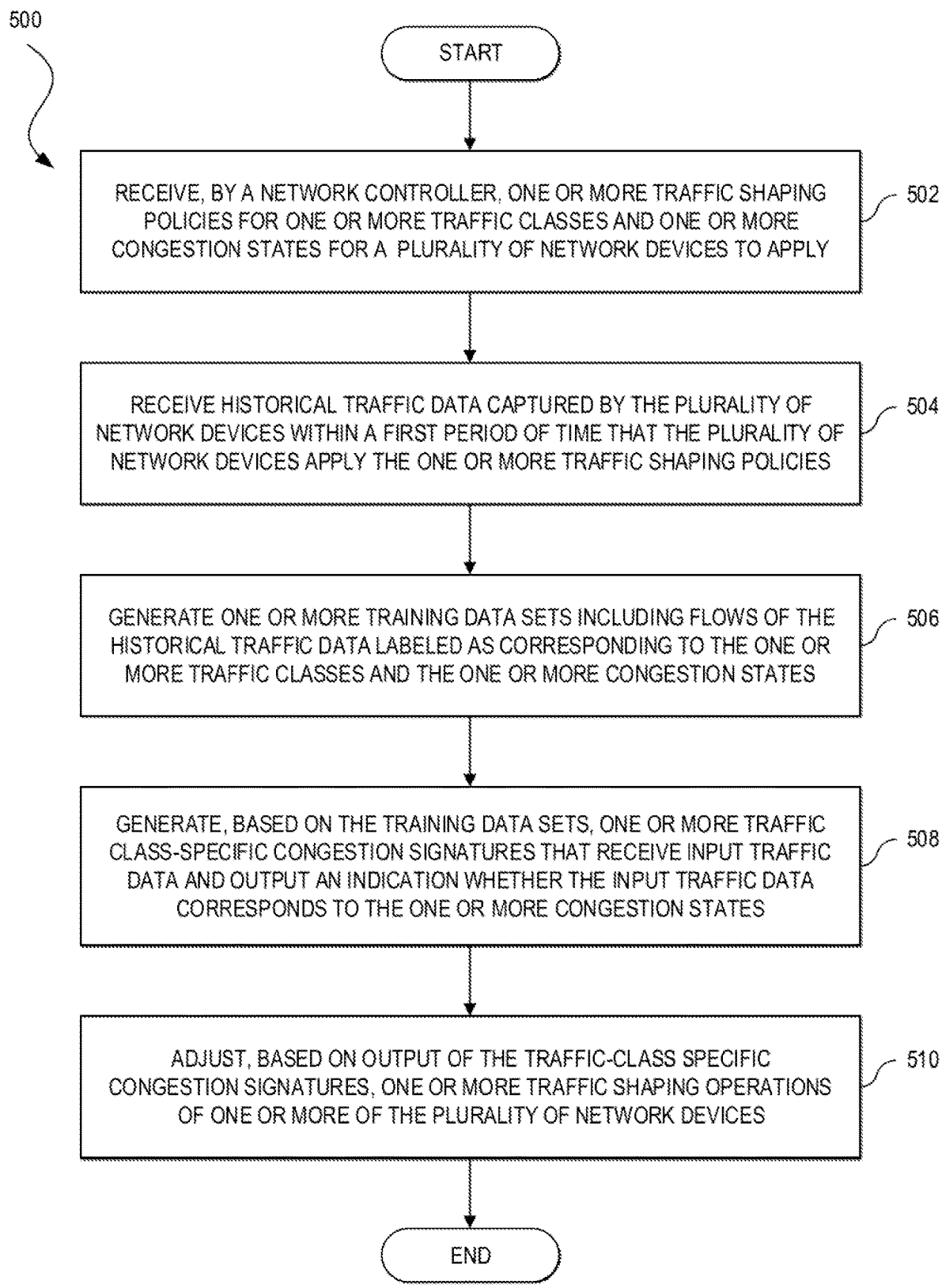
FIG. 5 illustrates an example of a process for generating traffic-class specific congestion signatures and other machine learning models to improve network performance in accordance with an embodiment.

FIG. 5 illustrates an example of a process 500 for generating traffic-class specific congestion signatures and other machine learning models to improve network operations, such as by optimizing traffic shaping, buffer utilization, and so on. The process 500 can be performed in whole or in part by a network management system or its components (e.g., the network controller appliance 104, the network management system 200, the assurance workflows 212, the network data platform 224, etc.), a machine learning platform (e.g., the machine learning platform 400), an analytics platform, and so on. In some embodiments, the network management system 200 can provide bi-directional REST APIs, SDKs, or other interfaces (referred to as Intent APIs or Integration APIs in Cisco DNA™ Center) to allow for the exchange of contextual information (e.g., network data, events, notifications, etc.) between the network management system 200 and other systems, including the machine learning platform 400. For simplicity and conciseness, a network controller can have access to the network management system 200, the machine learning platform 400, an analytics platform, or other system to perform the process 500.

The process 500 can begin at step 502 with the network controller receiving one or more traffic shaping policies for one or more traffic classes (including at least one predetermined traffic class) when flows of the one or more traffic classes are in one or more congestion states (including at least one predetermined congestion state). The traffic shaping policies can influence how network devices treat flows corresponding to certain traffic classes. For example, the traffic shaping policies can regulate the flow of traffic (on a per-traffic-class basis) to match the flow to a specified transmission rate or throughput or a transmission rate or throughput derived based on a level of network congestion. The traffic shaping policies can specify average rate or peak rate traffic shaping for better use of available bandwidth by permitting more data than the configured traffic shaping rate to be sent if the bandwidth is available. The traffic shaping policies can also support a hierarchical policy map structure. For example, traffic shaping policies can include a primary or parent-level policy and one or more secondary or child-level policies to apply other Quality of Service (QoS) features (e.g., Class-based Weighted Fair Queuing (CBWFQ), traffic policing, etc.).

Table 3 sets forth an example of an approach for how to configure traffic shaping in a network, including a definition of each traffic class; a priority, Quality of Service level, Service Level Agreement (SLA) designation, DSCP, Class of Service (CoS), IP precedence value, or other indicator of how to handle traffic of each traffic class relative to other traffic classes; a queuing and dropping policy for each traffic class; examples of the applications, services, or protocols of each traffic class; and a percentage of the bandwidth allocated to each traffic class. The network controller can distribute the traffic shaping policies to the network devices (e.g., the wireless access points 128, the access fabric access layer devices 126, the access fabric intermediate devices 124, the access fabric border devices 122, the access fabric control plane devices 110, the WLCs 108, the WAN fabric edge devices 310, sensors, etc.), under its administrative control, for the network devices to apply.

TABLE 3

Example Set of Traffic Classes and Applications, Services, or Protocols

| TRAFFIC CLASS | PRIORITY | QUEUING/ DROPPING | EXAMPLE APPLICATIONS | BANDWIDTH |
|---|---|---|---|---|
| Voice over IP (VoIP) | Expedited Forwarding (EF) | Priority Queueing (PQ) | VoIP telephony (bearer-only) (e.g., Cisco ® IP phones) | 10% |
| Broadcast video | Class Selector (CS) 5 | PQ | Broadcast television, live events, video surveillance flows, and other streaming media (e.g., Cisco ® IP Video Surveillance, Cisco ® Enterprise TV, etc.) | 10% |
| Real-time interactive | CS4 | PQ | High-definition interactive and video (e.g., Cisco ® Telepresence) | 13% |
| Multimedia conferencing; Multimedia streaming | Assured Forwarding (AF) 41 or AF31 | Bandwidth Queuing (BWQ) and DSCP Weighted Random Early Detection (WRED) | Desktop software multimedia collaboration, Video on Demand (VoD), desktop virtualization (e.g., Cisco Jabber ® and Cisco WebEx ®, etc.) | 10% |
| Network control | CS6 | BWQ | Network control plane traffic (e.g., EIGRP, OSPF, BGP, HSRP, IKE, LISP, OMP, COOP, etc.) | 3% |
| Signaling | CS3 | BWQ and DSCP | Control plane traffic for IP voice and video telephony | 2% |
| Operations, Administration, and Management (OAM) | CS2 | BWQ and DSCP | Network operations, administration, and management traffic (e.g., SSH, SNMP, syslog, etc.) | 3% |
| Transactional data (low-latency data) | AF21 | BWQ and DSCP WRED | Interactive data applications (e.g., Enterprise Resource Planning (ERP), Customer Relationship Management (CRM), other database applications, etc.) | 10% |

TABLE 3-continued

Example Set of Traffic Classes and Applications, Services, or Protocols

| TRAFFIC CLASS | PRIORITY | QUEUING/ DROPPING | EXAMPLE APPLICATIONS | BANDWIDTH |
|---|---|---|---|---|
| Bulk data (high-throughput data) | AF11 | BWQ and DSCP WRED | Non-interactive data applications (e.g., Email, File Transfer Protocol (FTP), backup applications, etc.) | 4% |
| Default forwarding (best effort) | DF | Default Queuing and Random Early Detection (RED) | Default applications | 25% |
| Scavenger | CS1 | Minimum BWQ and DSCP | Non-business related traffic flows and applications (e.g., entertainment media streaming) | 1% |

At step 504, the network controller can receive telemetry or traffic data (e.g., NetFlow records; network device statistics, such as CPU and memory utilization, interface counters, etc.; SNMP data; IP SLA performance measurements; system event (syslog) records, SSH CLI data, etc.) captured by the network devices within a period of time the network devices apply the one or more traffic shaping policies received at step 502. In some embodiments, the network controller can receive streaming telemetry from the network devices. Streaming telemetry can provide more data in formats that enable faster processing and more efficient data manipulation and validation and with exponentially greater speed and efficiency than conventional methods. In addition, the streaming telemetry can be model-driven or configurable via models (e.g., YANG) that specify where to stream, the encoding of the telemetry (e.g., JAVASCRIPT Object Notation (JSON), protocol buffers, etc.), the transport mechanism (e.g., NETCONF, RESTCONF, etc.), and so on. Streaming telemetry can be time-based (e.g., every thirty seconds) or event-based (e.g., on change of a network condition, such as when link utilization exceeds a threshold, when a configuration change is made, and so forth).

The network management system can use a big data platform for collecting and processing the streaming telemetry, such as APACHE SPARK, APACHE HADOOP, APACHE STORM, APACHE SAMZA, APACHE FUNK, APACHE APEX, APACHE FLUME, and the like. A big data platform is capable of storing large volumes (e.g., terabytes, petabytes, or more), receiving and transmitting data at high velocities (e.g., near real-time or real-time), and processing a large variety of data, such as data having different structure (e.g., structured, semi-structured, unstructured, etc.), data of different types (e.g., text, video, audio, etc.), data associated with different types of data stores (e.g., relational databases, key-value stores, document databases, graph databases, column-family databases, data analytic stores, search engine databases, time series databases, object stores, file systems, etc.), data originating from different sources (e.g., enterprise systems, social networks, etc.), data having different rates of change (e.g., batch, streaming, etc.), or data having other heterogeneous characteristics. In general, a big data platform can comprise a library and run-time engine that enable users to supply code or other logic to process "big data" without having to deal with the underlying complexity of resource negotiation, traffic management, and so forth.

SPARK is an in-memory cluster computing framework comprising SPARK Core, SPARK Structured Query Language (SQL), SPARK Streaming, MLib, and GraphX, among others. SPARK Core provides the basic functionality of the SPARK processing framework, and can include components for task scheduling, memory management, fault recovery, and interacting with storage systems. SPARK Core also includes the API for the SPARK framework's basic building blocks, resilient distributed datasets (RDDs). RDDs represent a collection of items distributed across many servers that can be operated upon in parallel. SPARK Core provides the functions for operating on these collections. SPARK SQL allows for querying of data persisted in a variety of types of data stores (e.g., key-value stores, graph databases, column-family databases, etc.) using SQL or variants (e.g., APACHE HIVE Querying Language (APACHE HQL)). SPARK SQL also supports integration of SQL and SQL-like queries with operations on RDDs using programmatic languages (e.g., PYTHON, JAVA, SCALA, etc.). SPARK Streaming provides an API for operating on data streams that closely match SPARK Core's API for operating on RDDs, making it easy for programmers to learn SPARK and move between applications that manipulate data stored in memory, on disk, or arriving in real time. MLib is a machine learning library, and provides functionality for classification, regression, clustering, and collaborative filtering, as well as supporting functionality such as model evaluation and data import. MLib also exposes some lower-level ML primitives, such as generic gradient descent optimization. GraphX is a library for operating on graphs and performing graph computations in parallel. GraphX also provides functions for operating on portions of a graph (e.g., vertices, edges, sub-graphs) and common graph algorithms (e.g., PageRank, triangle counting, etc.).

A SPARK application can include a driver program, a cluster manager, workers, executors, and tasks. The driver program can operate as a library to provide the data processing code executed by the workers. The cluster manager acquires resources for executing the application (e.g., standalone, APACHE MESOS, APACHE HADOOP Yet Another Resource Negotiator (YARN), etc.). The workers provide CPU, memory, and storage resources to the application and run the application as distributed processes on a cluster. The executors are virtual machines (e.g., JAVA virtual machine (JVM)) created on each worker). The executors can execute code concurrently in multiple threads, and can also cache data in memory or disk. A task is the smallest unit of work the application sends to an executor, which is executed by a thread in the executor. Each task can perform some computations to either return a result to the driver program or partition its output for shuffle. A SPARK application can create a task per data partition. As executors can run one or more tasks concurrently, the amount of parallelism can be determined by the number of partitions (e.g., more partitions can mean more tasks processing data in parallel).

HADOOP provides a framework for processing large datasets in parallel across a computer cluster. HADOOP can include a cluster manager (YARN), a distributed file system (HADOOP Distributed File System (HDFS)), and a distributed compute engine (MapReduce). HADOOP can abstract cluster computing and provide higher-level constructs for writing distributed data processing applications.

YARN is a clustering framework that separates resource management and job scheduling/monitoring into discrete functionalities. A YARN cluster includes a global resource manager and node managers for other nodes of the cluster. YARN also deploys a separate application master for each application, which can be a single job or a set of jobs. The resource manager can operate as a resource arbitrator for the applications in the cluster, and the server manager can operate as the per-server agent responsible for monitoring and managing containers and their usage of computing resources. The resource manager can include a scheduler and an applications manager. The scheduler can allocate resources to the applications according to policy, and the applications manager can handle job submissions, including requesting the first container for executing the application-specific application master and restarting the application master container upon failure. Each application master can be responsible for requesting additional containers from the scheduler and managing the containers.

HDFS is a distributed file system that can store data across a cluster of servers utilizing block storage or fixed-size blocks (e.g., 128 MB) spread across several different servers to parallelize read and write operations performed on data items. Distributing a file to multiple servers can increase the risk of a file becoming unavailable if one of the servers in a cluster fails. HDFS can mitigate this risk by replicating each file block on multiple servers (e.g., by a replication factor is 3). An HDFS cluster generally includes two types of nodes: a name node for managing the file system namespace (e.g., file metadata, such as file name, permissions, file block locations, and so on) and one or more data nodes for storing the contents of the file in blocks. To provide fast access to the metadata, the name node can store all the metadata in memory. When an application wants to read a file, it can first contact the name node. The name node can respond with the locations of all the blocks that comprise that file. A block location can identify the data nodes that hold data for that file block. The application can then send a read request to the data node for each file block.

When an application wants to write data to an HDFS file, it can first contact the name node to create a new entry in the HDFS namespace. The name node can check whether a file with the same name already exists and whether the application has permissions to create a new file. Next, the application can request the name node to select a set of data nodes for the first block of the file. A pipeline can be created between the replica data nodes hosting the first block, and the application can send the first block to the first data node in the pipeline. The first data node can store the first block locally and forward the first block to the second data node, the second data node can store the first block locally and forward the first block to a third data node, and so on. After the first block has been stored on the assigned data nodes, the application can request the name node to select the data nodes to host replicas of the second block. This process can continue until all blocks have been stored.

A MapReduce application can include two functions: map and reduce. The map function can receive a key-value pair as input, and can output a set of intermediate key-value pairs. MapReduce can call the map function once for each key-value pair in the input dataset. MapReduce can sort the output from the map functions and group all intermediate values associated with the same intermediate key. MapReduce can pass the intermediate values as input to the reduce function. The reduce function can aggregate the intermediate values, and can output the aggregated value along with the intermediate key that it received as its input.

STORM is based on the concepts of "spouts" and "bolts." Spouts are sources of information and transfer information to one or more bolts. This information can be linked to other bolts, and the topology forms a DAG. Developers can define how the spouts and bolts are connected.

SAMZA uses a publish/subscribe task model in which a task listens in on a particular data stream, processes messages upon arrival to the stream, and outputs the processing results to one or more subscribing streams. SAMZA can divide a stream into multiple partitions and provision a replica of the task for every partition. SAMZA may rely on other platforms to handle certain tasks, such as APACHE KAFKA for the streaming of data between tasks and YARN for resource management and job scheduling.

KAFKA utilizes the concepts of producers that publish a stream of records or messages to one or more KAFKA topics or channels, consumers that subscribe to one or more topics and process the messages produced to them, stream processors that consume an input stream from one or more topics and produce an output stream to one or more output topics (i.e., transforming input streams to output streams), and connectors that provide interoperability between producers and consumers and existing data systems.

Streams of data in KAFKA are made up of multiple partitions (based on a key value). A SAMZA task can consume a KAFKA stream, and multiple tasks can be executed in parallel to consume all of the partitions in a stream simultaneously. SAMZA tasks can execute in YARN containers. YARN can distribute the containers over multiple nodes in a cluster and evenly distribute tasks over containers.

FLINK is based on the concept of streams and transformations. Data comes into the system via a source and leaves via a sink. To produce a FUNK job, APACHE MAVEN is used to create a skeleton project including dependencies and packaging requirements to enable developers to immediately add custom code without this overhead. FLINK also uses a declarative engine, and the sequence of operations is implicitly defined by the ordering of the transformations. If FUNK determines that a particular transformation does not depend on the output from another transformation, then FLINK can rearrange the transformations to increase parallelism.

APEX provides a stream and batch processing platform based on HADOOP and a framework for building distributed applications. APEX utilizes HDFS for persisting state and YARN for scheduling, resource management, jobs, security, multi-tenancy, and fault-tolerance, and so forth.

FLUME is a Complex Event Processor (CEP) for processing large amounts of log data, network traffic data, social network data, email, and the like. A FLUME event is defined as a unit of data flow having a byte payload and an optional set of string attributes. A FLUME agent is a process that hosts the components through which events flow from an external source to the next destination (hop). A FLUME source consumes events delivered to it by an external source, such as a web server. The external source sends events to FLUME, which stores it into one or more channels. The channel is a passive store that keeps the event until it is consumed by a FLUME sink, which removes the event from the channel and puts it into an external repository, such as HDFS, or forwards it to the FLUME source of the next FLUME agent (next hop) in the flow. The source and sink within the FLUME agent can run asynchronously with the events staged in the channel.

At step 506, the network controller can generate one or more training data sets based on the telemetry or traffic data captured at step 504. As discussed above with respect to the traffic data collector 404, the network controller can capture traffic data at various levels of granularity (e.g., datagrams, flows, etc.) and derive various features or characteristics from the traffic data (e.g., Table 1), including the traffic class, congestion state, or other category to which a unit of traffic data belongs. For example, the network controller can receive the traffic data as traffic class-specific TCP flows captured by the network devices within a specified period of time. The network controller can further distinguish the traffic class-specific flows by intervals within the specified period of time when the flows are in a predetermined congested state. The predetermined congestion state can be binary, such as congested or not congested, or a multi-class state corresponding to different levels of network congestion. Alternatively or in addition, the predetermined congestion state can also identify whether congestion is self-limiting or external.

In some embodiments, the network controller may use only the flows of a predetermined traffic class and predetermined congestion state as congested flows and labeling the remaining flows as not corresponding to the predetermined traffic class and predetermined congestion state. Alternatively or in addition, the network controller can label flows by more specific congestion states when there are multiple congestion states and/or label flows by more specific traffic classes when there are multiple traffic classes. In still other embodiments, the network management system can generate the training data by labeling all flows by their specific traffic class and specific congestion state.

In some embodiments, the network controller can create multiple training data sets. For example, a training data set may comprise first labeled flows only corresponding to the predetermined traffic class and predetermined congestion state. Another training data set may comprise the first labeled flows and all remaining flows labeled as not corresponding to the predetermined traffic class and predetermined congestion rate. Another training data set may comprise the first labeled flows and all remaining flows labeled as corresponding to the predetermined traffic class labeled and one or more other congestion states. Another training data set may comprise the first labeled flows and all remaining flows labeled as corresponding to the predetermined congestion state and one or more other traffic classes. Another training data set may comprise all flows labeled by their traffic class and congestion state, and so on. In some cases, the network controller can select a particular training data set for building a machine learning model based on a size of the training data set and/or a precision (e.g., proportion of positive predictions that are correctly predicted), recall (e.g., proportion of actual positives that are correctly predicted), accuracy (e.g., proportion of correct predictions among the total number of predictions, etc.), or other performance metric or characteristic of the multiple training data sets. Table 4 sets forth examples of other metrics for evaluating the performance of different training data sets.

TABLE 4

Performance Metrics for Machine Learning Models

| METRIC | DESCRIPTION |
| --- | --- |
| Mean Absolute Error | Average of the absolute error between the actual and predicted values |
| Mean Squared Error | Average of the squares of the error between the actual and predicted values |
| Mean Absolute Prediction Error | Percentage of the error between the actual and predicted values |
| Root Mean | Squared Error The standard deviation of the error between the actual and predicted values |
| Cross-entropy | Metric based on the logistic function that measures the error between the actual and predicted values |
| Accuracy | Proportion of correct predictions among the total number of predictions |
| True Positive Rate or Recall | Proportion of actual positives that are correctly predicted |
| False Positive Rate | Proportion of actual negatives predicted as positives |
| True Negative Rate | Proportion of actual negatives that are correctly predicted |
| False Negative Rate | Proportion of actual positives predicted as negatives. Inversely proportional to the statistical power of a model |
| Received Operating Characteristic (ROC) | Curve that plots TPR versus FPR at different parameter settings |
| Area Under the ROC Curve | Probability of confidence in a model to accurately predict positive outcomes for actual positive instances |
| Precision | Proportion of positive predictions that are correctly predicted |
| F-measure | Harmonic mean of precision and recall | mined congestion state as a training data set. In other embodiments, the network controller can generate a training data set by labeling traffic class-specific flows corresponding to the predetermined traffic class and predetermined con- In some embodiments, the network controller can allow a user to select multiple training data sets, multiple machine learning techniques (including whether the classifier or regression model is a single-class classifier or a single dependent variable regression model, a multi-class classifier for all traffic class defined in the network or a multiple dependent variable regression model for all dependent variables, or different permutations in between), and/or multiple performance metrics for evaluating which training data set and/or which machine learner to deploy in the network devices. The network controller can build a model for each permutation of a selected training data and a selected machine learner, and output the performance metrics for each permutation or a summary of the metrics for each permutation (e.g., top 10 most accurate, top 10 highest recall, top 10 highest precision, etc.). The network controller can select the top performing permutations or enable the user to select the permutations for the final machine learning models that the network devices can apply.

In some embodiments, the network controller can also extract features from traffic data as part of generating the training data sets. For example, in addition to assigning one or more labels indicating the traffic class and congestion state of a flow, the network controller can also calculate the minimum, maximum, and CV of RTTs sampled during RTT sampling periods for a flow as part of assembling the training data sets for the traffic class-specific congestion signatures 426. As another example, in addition to assigning one or more labels indicating the traffic class and congestion state of a flow and calculating the minimum, maximum, and CV of RTTs sampled during an RTT sampling period for the flow, the network controller can also calculate a window size W, congestion threshold T, and number of acknowledged bytes $ACK_{BYTES}$ (cumulative and/or instant) at the end of the RTT sampling period for the flow as part of assembling the training data sets for the window size and congestion threshold estimators 428.

At step 508, the network controller can build one or more machine learning models for evaluating the traffic data observed by the network devices to improve network operations. In some embodiments, the network controller can generate the traffic class-specific congestion signatures 426 by applying the training data sets to one or more classifiers (e.g., logistic regression classifier, LDA classifier, QDA classifier, SVM classifier, SGD classifier, K-NN classifier, GPC, Naïve Bayes classifier, decision tree classifier, random forest classifier, boosting classifier, neural network classifier, etc.). As discussed above, the network controller may evaluate multiple permutations of training data sets and classifiers and select the final classifiers the network devices apply based on the size of the training data sets and the precision, recall, accuracy, and/or other performance metrics of each permutation. In some embodiments, the traffic class-specific congestion signatures 426 may utilize different types of classifiers for different sets of (one or more) traffic classes. For example, the congestion signature for a first traffic class may be first type of classifier (e.g., an SVM classifier) because the first type of classifier may perform better in classifying a flow of the first traffic class better than other types of classifiers while the congestion signature for a second traffic class may be a second type of classifier (e.g., a neural network classifier) because the second type of classifier may perform better in classifying flows of the second traffic class than other types of classifiers.

In some embodiments, the network controller can generate the traffic class-specific window size and/or congestion threshold estimators 428 by applying the training data sets to one or more regressions (e.g., linear regression, polynomial regression, kernel ridge regression, SVR, SGD regression, K-NN regression, GPR SVR, decision tree regression, Gradient Tree regression, etc.). In some embodiments, the network controller can identify a polynomial function that best fits the training data set for one or more traffic classes. The polynomial function can include multiple independent variables based on the minimum, maximum, and CV of RTTs sampled during the RTT sampling periods and $ACK_{BYTES}$. For example, the independent variables can comprise the minimum, maximum, and CV of RTTs and $ACK_{BYTES}$ as separate variables, a combination of multiple independent variables (e.g., the difference of the maximum and minimum RTTs as a single independent variable), transformations of the independent variables (e.g., normalizing the difference of the maximum and minimum RTTs by dividing the difference by the maximum RTT), and so on. The polynomial function can comprise a single dependent variable (e.g., the window size W or the congestion threshold T) or multiple dependent variables (e.g., both the window size W and the congestion threshold T). As discussed above, the controller may evaluate multiple permutations of training data sets and regressions and select the final regressions the network devices apply based on the size of the training data sets and precision, recall, accuracy, and/or other performance metrics of each permutation. In some embodiments, the traffic class-specific window size and/or congestion threshold estimators 428 may utilize different regression algorithms (in addition to different polynomial functions) for different sets of traffic classes.

In some embodiments, the network controller can generate the STACKing reinforcement learning agents 430 for the network devices to apply to determine whether to perform STACKing using Q-learning (e.g., JAL, FMQ, Team Q-Learning, Distributed Q-Learning, or OAL, among other reinforcement learners.

In some embodiments, the network controller can periodically re-run machine learning workflows using more recent traffic data or traffic data observed over longer period of times as the traffic data accumulates. The network controller can update the traffic class-specific congestion signatures 426, the window size and/or congestion threshold estimators 428, and/or the STACKing reinforcement learning agents 430. For example, if the performance metrics for models generated from more recent traffic data show a significant drift in traffic patterns such that the more recently generated models are likely to perform better than older models, the network controller can update the network devices to apply the more recently generated models. As another example, if the performance metrics for models generated from traffic data occurring over longer periods of time improve upon older models, then the network controller can update the network devices to apply the models generated from traffic data spanning longer periods of time.

At step 510, the network controller can distribute the machine learning models generated at step 508 to the network devices for the devices to apply to new traffic data, and the network controller can receive the output of the machine learning models. For example, the network controller can continuously monitor the performance of a machine learning model and when precision, recall, accuracy, and/or other performance metrics (e.g., Table 4) are below certain thresholds or when a new machine learning model improves on the performance of the older machine learning model, the network controller can generate an alert to inform an administrator to update the older machine learning model. As another example, the network controller can receive congestion information from individual network devices when they believe the flows they process experience congestion. The network controller can aggregate the congestion information from the network devices and other sources throughout the network, and identify if throughput is abnormally low compared to expectation for a given location, time of day, device type, and so on, to facilitate root-cause analysis for the abnormal throughput. If the traffic class-specific congestion signatures 426 can distinguish between self-limiting or external congestion, the network controller can generate reports regarding where and when additional capacity can improve network performance. In some embodiments, the network controller can use congestion information to identify root causes of potential network outages as they develop, and preemptively remediate these issues before a network outage occurs.

In some embodiments, the network devices may rely on one or more STACKing reinforcement learning agents 430 to determine whether to perform STACKing on traffic data flowing through the network devices. For a first time step, each STACKing reinforcement learning agent 430 can randomly select an action for the network object the agent represents (e.g., a traffic class, a network device, a virtual network segment, a flow, etc.) that transitions from the initial state to the next state and receive a reward as a result of the state transition. Each STACKing reinforcement learning agent can update Q-values for the state-action pair with the reward and the expected return:

$$Q_{t+1}(s_t, a_t) = r_{t+1} + \gamma \max_a Q(s_{t+1}, a)$$

until transitioning to an end state. The process can be repeated iteratively for a first time period until the STACKing reinforcement learning agents 430 determine the optimal state-action function Q*. The optimal policy for each agent can be learned by applying a greedy policy to Q*. Table 5 sets forth an example of pseudo-code for Q-learning.

TABLE 5

Example of Pseudo Code for Q-Learning

1. Initialize Q(s, a) (e.g., set Q(s, a) to 0)
2. Repeat for each episode:
3.    Initialize s
4.    Repeat for each step of episode:
5.      Select and perform action a
6.      Observe reward r, and new state s'
7.      Update $Q(s, a) \leftarrow \gamma \max_{a'} Q(s', a')$
8.      Update s ← s'

In some embodiments, the network controller can receive Selective Tracking of Acknowledgments (STACKing, e.g., stacking acknowledgment information in main memory or on-chip memory of a network device instead of the device's interface buffers or off-chip memory) information from individual network devices as discussed further below with respect to FIG. 6 and elsewhere in the present disclosure. The network controller can administer STACKing across network devices. Network devices can have different amounts of computing resources (e.g., CPU or NPU, main memory or on-chip memory, interface buffers or off-chip memory, etc.), observe different types of traffic, and experience congestion due to different parts of the network. The network controller can receive resource utilization, throughput, drop rate, and STACKing information from individual network devices, and adjust STACKing behavior of the individual network devices to prevent STACKing from over-extending the devices' CPUs or NPUs or main memory and negatively affect the devices' packet processing performance. The network controller can also ensure network devices perform STACKing on a sufficient proportion of flows during periods of network congestion to reduce buffer utilization, minimize packet drops, and optimize throughput. In some cases, the network controller can adjust traffic shaping policies or add capacity to optimize throughput.

The process 500 can conclude at step 512 by the network controller adjusting one or more traffic shaping operations of the network devices based on the output from the traffic class-specific congestion signatures 426, the window size and/or congestion threshold estimators 428, the STACKing reinforcement learning agents 430, and other machine learning models. For example, the controller can reconfigure or customize the machine learning models applied at an individual network device to account for the device's unique context, such as its available hardware resources, traffic patterns, link utilization, and so on. The network controller can also update the network devices' existing machine learning models with newer, better performing machine learning models. In addition, the network controller can adjust how and when the network devices perform STACKing to account for the different contexts of the network devices. One of ordinary skill in the art will understand that the network controller can configure numerous other traffic operations of the network devices based on the output of the traffic class-specific congestion signatures 426, the window size and/or congestion threshold estimators 428, the STACKing reinforcement learning agents 430, and other machine learning models.

Figure 6:
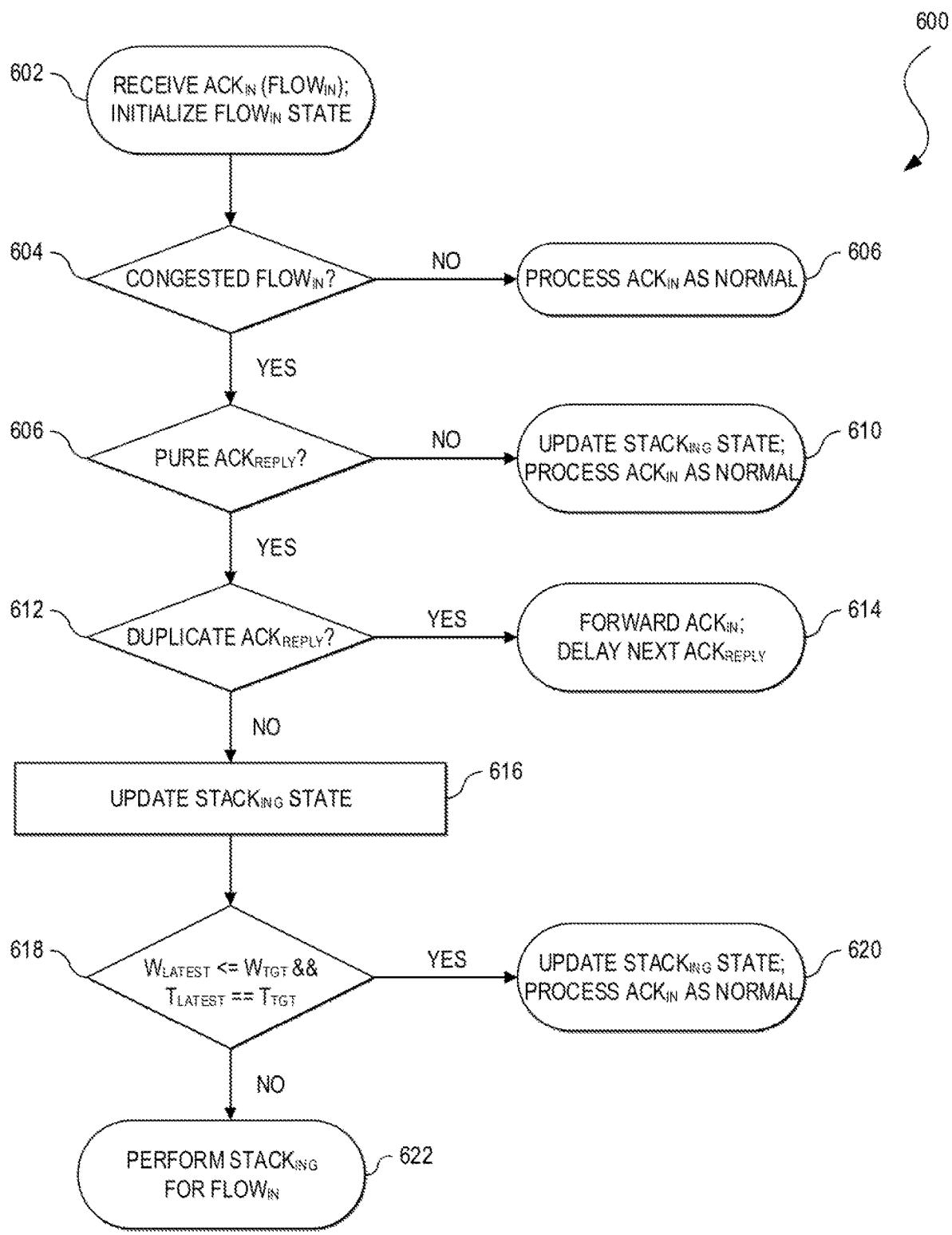
FIG. 6 illustrates an example of process that a network device can perform to selectively track acknowledgments to improve the device's buffer utilization and traffic shaping in accordance with an embodiment.

FIG. 6 illustrates an example of a process 600 for Selective Tracking of Acknowledgments (STACKing) to improve buffer utilization and traffic shaping of one or more network devices. The process 600 can be performed in whole or in part by one or more network devices (e.g., the wireless access point 128, the access fabric access layer device 126, the access fabric intermediate device 124, the access fabric border device 122, the access fabric control plane device 110, the WLC 108, the WAN fabric edge device 310, the provider edge device 312, etc.) or an upstream system for managing the one or more network devices (e.g., the access fabric controller appliance 104, the network management system 200, the WAN fabric controller 308, etc.). In this example, a STACKing agent running an access layer device (e.g., the access fabric access layer device 126 or the wireless access point 128) connected wired or wirelessly to a TCP sender (e.g., the endpoint 130) can perform the process 600. However, other embodiments may perform equivalent processes for other acknowledgment-based network protocols and/or other network devices or systems without departing from the scope of the present disclosure by applying the principles disclosed herein.

The STACKing agent can identify TCP flows (sometimes also referred to as TCP connections or sessions) that correspond to a predetermined traffic class and predetermined congestion state. The STACKing agent can track information of at least some TCP ACKs (e.g., pure TCP $ACK_{REPLY}$'s) of selected flows in the main memory (e.g., on-chip memory) of the agent's network device, filter the pure TCP $ACK_{REPLY}$'s of the selected flows from the interface buffers or off-chip memory of the agent's network device (e.g., exclude the pure TCP $ACK_{REPLY}$'s from the network device's interface buffers or off-chip memory), re-generate the filtered TCP $ACK_{REPLY}$'s from STACKing state information stored in main memory, and transmit the re-generated TCP $ACK_{REPLY}$'s according to traffic shaping policies specified for the predetermined traffic class and predetermined congestion state. In this manner, the STACKing agent can optimize traffic shaping by achieving quicker convergence to network behavior specified by an operator and providing smoother throughput (e.g., by reducing unnecessary TCP window size shrinking) for the network device. The STACKing agent can also significantly reduce the amount of buffer space the agent's network device may need for traffic shaping, and thereby provide network devices that are more adaptive to different types of traffic.

The process 600 can begin at step 602 in which the STACKing agent can receive an input TCP ACK ($ACK_{IN}$). If $ACK_{IN}$ is part of a new TCP connection or $ACK_{IN}$ is the first TCP ACK after a connection timeout, the STACKing agent can initialize or update TCP flow state information for a TCP flow corresponding to $ACK_{IN}$ ($FLOW_{IN}$). The flow state information for $FLOW_{IN}$ can include a flow-tuple (e.g., source IP address, source port number, destination IP address, destination port number, protocol, etc.), a cumulative number of bytes acknowledged $ACK_{BYTES}$ (discussed further below) by a TCP sender during a Round Trip Time (RTT) sampling period and various statistical information regarding RTTs of the RTT sampling period. The RTT sampling period can include the period between when $FLOW_{IN}$ is established and after a first retransmission or fast retransmission, the period between a latest RTO and a retransmission, the last 5-10 RTTs, the last 5-10 minutes, and so on. The statistical RTT information can include the number N, the minimum ($RTT_{MIN}$), the maximum ($RTT_{MAX}$), the mean RTT ($\overline{RTT}$), the standard deviation ($\sigma$), the sum of squares of differences from mean ($M_{2,N}$), the sample variance ($S_N^2$), the population variance ($\sigma_N^2$), and the Coefficient of Variation (CV) of the sampled RTTs, among other statistical RTT information. In some embodiments, the STACKing agent can incrementally determine the statistical RTT information by calculating the latest statistical RTT values (N) from immediately preceding RTT statistical values (N−1) as follows:

$$\overline{RTT}_N = \overline{RTT}_{N-1} + \frac{RTT_N - \overline{RTT}_{N-1}}{N} \quad \text{(Equation 9)}$$

$$M_{2,N} = M_{2,N-1} + (RTT_N - \overline{RTT}_{N-1})(RTT_N - \overline{RTT}_N) \quad \text{(Equation 10)}$$

$$S_N^2 = \frac{M_{2,N}}{N-1} \quad \text{(Equation 11)}$$

$$\sigma_N^2 = \frac{M_{2,N}}{N-1} \quad \text{(Equation 12)}$$

$$CV_N = \frac{\sigma_N}{\overline{RTT}_N} \quad \text{(Equation 13)}$$

Table 6 sets forth an example of TCP flow state information the STACKing agent can maintain for a TCP flow, including information identifying the flow (e.g., the flow-tuple), the cumulative number of bytes acknowledged $ACK_{BYTES}$ (discussed further below), and the number N, $RTT_{MIN}$, $RTT_{MAX}$, $\overline{RTT}$, and $M_{2,N}$ of the RTTs sampled during the RTT sampling period. In some embodiments, the STACKing agent can maintain the TCP flow information on a per traffic class basis. For example, the STACKing agent can map flows to traffic classes, such as by the mappings shown in Table 7. When the STACKing agent detects establishment of a new TCP connection, the STACKing agent can update the RTT statistical information (e.g., the $RTT_{MIN}$, $RTT_{MAX}$, $M_{2,N}$ $S_N^2$, $\sigma_N^2$, $CV_N$, etc.) from the RTT sampling period (e.g., using Equations 9-13). Long-lived flows can reference the latest statistical RTT information when necessary.

TABLE 6

TCP Flow State Information

| STATE PARAMETER | DESCRIPTION |
| --- | --- |
| Flow Tuple | Information for identifying a TCP flow (e.g., Source IP address, Source Port, Destination IP address, Destination Port, Protocol, etc.) |
| Cumulative $ACK_{BYTES}$ | Cumulative number of bytes transmitted by a TCP sender and acknowledged by a TCP receiver during an RTT sampling period for a TCP flow |
| N | Number of RTTs sampled during an RTT sampling period for a TCP flow |
| $RTT_{MIN}$ | Minimum of RTTs sampled during an RTT sampling period for a TCP flow |
| $RTT_{MAX}$ | Maximum of RTTs sampled during an RTT sampling period for a TCP flow |
| $RTT_N$ | Mean of RTTs sampled during an RTT sampling period for a TCP flow |
| $M_{2,N}$ | Sum of square differences of Mean of RTTs sampled during an RTT sampling period for a TCP flow |

TABLE 7

Example Mapping of Flows to Traffic Classes

| FLOW PARAMETER(S) | TRAFFIC CLASS(ES) |
| --- | --- |
| Access Control list (ACL) number or | ACL-based classes |
| ATM Cell Loss Priority (CLP) value | ATM CLP-based classes |
| Class map name | User-defined traffic classes |
| Discard class value | Discard class-based traffic classes |
| Differential Services Code Point (DSCP) value | DSCP-based traffic classes |
| Fields defined in the Protocol Header Description Files (PHDFs) | PHDF-based traffic classes |

TABLE 7-continued

Example Mapping of Flows to Traffic Classes

| FLOW PARAMETER(S) | TRAFFIC CLASS(ES) |
|---|---|
| Frame Relay Data-Link Connection Identifier (DLCI) number | Frame Relay DLCI-based traffic classes |
| Frame Relay Discard Eligibility (DE) bit setting | Frame Relay DE-based traffic classes |
| Input interface name | Input interface-based traffic classes |
| IP precedence values | IP precedence-based traffic classes |
| Layer 2 Class of Service (CoS) value | CoS-based traffic classes |
| Layer 3 packet length in the IP header | Packet length-based traffic classes |
| MAC address | MAC address-based traffic classes |
| Multiprotocol Label Switching (MPLS) Experimental (EXP) value | MPLS EXP-based traffic classes |
| MPLS EXP value in the topmost label | MPLS topmost EXP-based traffic classes |
| Port type | Port type-based traffic classes |
| Protocol type | Protocol type-based traffic classes |
| Protocol type == rtp | RTP traffic class |
| Protocol type == fasttrack | FastTrack peer-to-peer traffic class |
| Protocol type == http | Hypertext Transfer Protocol (HTTP) traffic class |
| Protocol type == nbar | Network-Based Application Recognition (NBAR) traffic classes (e.g., payload-based traffic classes, such as traffic classes based on Uniform Resource Locator (URL), host, Multipurpose Internet Mail Extensions (MIME) type; File Transfer Protocol (FTP), DNS, Post Office Protocol (POP3), etc.) |
| QoS group value | QoS group-based traffic classes |
| Real-Time Transport Protocol (RTP) port | RTP port-based traffic classes |
| Start of datagram | Layer-based traffic classes (e.g., Layer 2 traffic or Layer 3 traffic) |
| Tag type of class map | User-defined tag-based traffic classes |
| VNID or other virtual network segment identifier (e.g., VLAN, VRF, VPN, EPG, SGT, etc.) | Virtual network segment-based traffic classes |

At decision block 604, the STACKing agent can determine whether $ACK_{IN}$ is part of a congested flow. In some embodiments, the STACKing agent can receive one or more traffic class-specific congestion signatures 426 from a network management system (e.g., the network management system 200) that the STACKing agent can apply to $ACK_{IN}$ or $FLOW_{IN}$ to evaluate whether $ACK_{IN}$ is part of a congested flow or $FLOW_{IN}$ is a congested flow. As discussed above with respect to FIG. 4 and elsewhere in the present disclosure, the traffic class-specific congestion signatures 426 can comprise one or more traffic class-specific classifiers or other machine learning models whose input can include traffic data (e.g., TCP segment, TCP flow, etc.) corresponding to a particular traffic class and whose output is an indication whether the traffic data corresponds to a predetermined congestion state. For example, given $FLOW_{IN}$, a traffic class-specific congestion signature can determine whether $FLOW_{IN}$ corresponds to flows of a particular traffic class when the flows of that traffic class are in a particular congestion state. If $ACK_{IN}$ and $FLOW_{IN}$ do not match any of the congestion signatures, then $ACK_{IN}$ is not part of a congested flow and $FLOW_{IN}$ is not a congested flow. Therefore, the STACKing agent does not select $FLOW_{IN}$ for STACKing, and the STACKing agent can conclude the process 600 and handle $ACK_{IN}$ as normal at step 606 (e.g., forward, drop, reject, queue, etc.). In some embodiments, if $FLOW_{IN}$ was previously STACKed, the STACKing agent can also ensure transmission of any outstanding TCP ACKs that have not yet been sent for $FLOW_{IN}$.

If $ACK_{IN}$ or $FLOW_{IN}$ match a congestion signature, then $ACK_{IN}$ is part of a congested flow and $FLOW_{IN}$ is a congested flow, and the process 600 can proceed to decision block 608 after the STACKing agent initializes or updates STACKing state information for $FLOW_{IN}$. For example, the STACKing state information can include information regarding the latest Request ACK ($ACK_{REQ}$) or the latest ACK that a TCP sender transmits to a receiver and the latest Reply ACK ($ACK_{REPLY}$) or the latest ACK that the TCP sender receives from the receiver in response to the latest $ACK_{REQ}$. If a Reply ACK does not have a payload, it may be referred to as a pure ACK because the segment only signals acknowledgment of TCP sender data and does not include TCP data.

Table 8 shows an example of a TCP flow between two endpoints (e.g., the endpoints 130), such as a web server and a client. Table 8 can include a numeric ordering of the TCP segments, contents of the TCP segments exchanged (with the length of the ACK denoted in parentheses), a direction of the TCP segments (e.g., the client on the left-hand side, and the web server on the right-hand side), a relative TCP sequence number $SEQ_{NO}$, a relative TCP acknowledgment number $ACK_{NO}$, and the cumulative number of bytes acknowledged, $ACK_{BYTES}$. $ACK_{BYTES}$ can refer to the difference between the $ACK_{NO}$ of the latest $ACK_{REPLY}$ received by the TCP sender and the $ACK_{NO}$ of the first $ACK_{REQ}$ transmitted by the TCP sender during an RTT sampling period:

$$\text{Cumulative } ACK_{BYTES} = ACK_{REQ} \cdot ACK_{NO} - ACK_{REQ} \cdot ACK_{NO} \quad \text{(Equation 14)}$$

TABLE 8

Example of a TCP Flow

| NO. | TCP SEGMENT | DIR | $SEQ_{NO}$ | $ACK_{NO}$ | $ACK_{BYTES}$ |
|---|---|---|---|---|---|
| 1 | SYN (0 bytes) | → | 0 | 0 | — |
| 2 | SYN, ACK (0 bytes) | ← | 0 | 1 | 1 |
| 3 | ACK (0 bytes) | → | 1 | 1 | 1 |
| 4 | PSH, $ACK_{REQ}$ (725 bytes) | → | 1 | 1 | 1 |
| 5 | $ACK_{REPLY}$ (0 bytes) | ← | 1 | 726 | 725 |
| 6 | $ACK_{REQ}$ (1448 bytes) | ← | 1 | 726 | 725 |
| 7 | $ACK_{REPLY}$ (0 bytes) | → | 726 | 1449 | 1448 |
| 8 | $ACK_{REQ}$ (1448 bytes) | ← | 1449 | 726 | 725 |
| 9 | $ACK_{REPLY}$ (0 bytes) | → | 726 | 2897 | 2896 |
| 10 | $ACK_{REQ}$ (1448 bytes) | ← | 2897 | 726 | 725 |
| 11 | $ACK_{REPLY}$ (0 bytes) | → | 726 | 4345 | 4344 |
| 12 | $ACK_{REQ}$ (1448 bytes) | ← | 4345 | 726 | 725 |
| 13 | $ACK_{REPLY}$ (0 bytes) | → | 726 | 5793 | 5792 |
| 14 | $ACK_{REQ}$ (1448 bytes) | ← | 5793 | 726 | 725 |
| 15 | $ACK_{REPLY}$ (0 bytes) | → | 726 | 7241 | 7240 |
| 16 | $ACK_{REQ}$ (1448 bytes) | ← | 7241 | 726 | 725 |
| 17 | $ACK_{REPLY}$ (0 bytes) | → | 726 | 8689 | 8688 |

In Table 8, the TCP flow can begin with a TCP handshake corresponding to segment numbers 1-3, and can further include an HTTP request, from the client (as the TCP sender) to the web server (as the TCP receiver), corresponding to TCP segment numbers 4-5, and an HTTP response, from the server (as the TCP sender) to the client (as the receiver), corresponding to TCP segments 6-17. If the RTT sampling period occurs over TCP segment numbers 1-17, the cumulative number of acknowledged bytes $ACK_{BYTES}$ for the web server (as the TCP sender) can be calculated by taking the difference of the $ACK_{NO}$ of the latest $ACK_{REPLY}$ received by the web server (e.g., TCP segment number 17 having the $ACK_{NO}$ of 8689) and the $ACK_{NO}$ of the first $ACK_{REQ}$ transmitted by the web server (e.g., TCP segment number 6 having the $ACK_{NO}$ of 1) (i.e., 8689−1=8688). The cumulative number of acknowledged bytes $ACK_{BYTES}$ for the client (as the TCP sender) can be calculated by taking the difference of the $ACK_{NO}$ of the latest $ACK_{REPLY}$ received by the client (e.g., TCP segment number 5 having the $ACK_{NO}$ of 726) and the $ACK_{NO}$ of the first $ACK_{REQ}$ transmitted by the client (e.g., TCP segment number 4 having the $ACK_{NO}$ of 1) (i.e., 726−1=725). Although the number of acknowledged bytes $ACK_{BYTES}$ in these examples are cumulative, other embodiments may also use instant values of $ACK_{BYTES}$ when the RTT sampling period comprises a single RTT:

$$\text{Instant } ACK_{BYTES} = ACK_{REPLY} \cdot ACK_{NO} - ACK_{REPLY-1} \cdot ACK_{NO} \quad \text{(Equation 15)}$$

$$\text{Instant } ACK_{BYTES} = ACK_{REPLY} \cdot ACK_{NO} - ACK_{REQ} \cdot SEQ_{NO} \quad \text{(Equation 16)}$$

$$\text{Instant } ACK_{BYTES} = ACK_{REQ} \cdot LEN \quad \text{(Equation 17)}$$

For example, the instant $ACK_{BYTES}$ for the RTT corresponding to TCP segment numbers 16-17 can be calculated by taking the difference of the $ACK_{NO}$ of the latest $ACK_{REPLY}$ received by the web server (e.g., the TCP segment number 17 having the $ACK_{NO}$ of 8689) and the $ACK_{NO}$ of the immediately preceding $ACK_{REPLY}$ received by the web server (e.g., the TCP segment number 15 having the $ACK_{NO}$ of 7241) (i.e., 8689−7241=1448), which is also equivalent to the difference between the latest $ACK_{REPLY} \cdot ACK_{NO}$ and the $SEQ_{NO}$ of the latest $ACK_{REQ}$ transmitted by the TCP sender (i.e., 8689−7241=1448), as well as the length (LEN) of the latest $ACK_{REQ}$ transmitted by the TCP sender (i.e., the TCP segment number 16 having the LEN of 1448). In some embodiments, the network device may support piggybacking of TCP sender data in $ACK_{REPLY}$'s, and a TCP ACK can operate as both an $ACK_{REPLY}$ received by a TCP sender and an $ACK_{REQ}$ sent by a TCP sender. For example, the web server may combine the TCP ACKs corresponding to segment numbers 5-6, and the combined TCP ACK can function as both an $ACK_{REPLY}$ received by a TCP sender (i.e., the client) responsive to the $ACK_{REQ}$ corresponding to TCP segment number 4, and as an $ACK_{REQ}$ transmitted by a TCP sender (i.e., the web server) to which the $ACK_{REPLY}$ corresponding to TCP segment number 7 is responsive.

As shown by Table 8, pure $ACK_{REPLY}$'s (e.g., the $ACK_{REPLY}$'s corresponding to TCP segment numbers 5, 7, 9, 11, 13, 15, 17, etc.) carry only TCP acknowledgment signaling information and no TCP sender data but can quickly accumulate in a conventional network device's buffers. During a period of time the network is in a congested state, the conventional network device may buffer dozens, hundreds, or more pure $ACK_{REPLY}$'s. This can consume a significant amount of the conventional network device's buffer space as well as increase latency to schedule their transmissions. In addition, if the conventional network device runs out of buffer space, the conventional network device may drop traffic and reset TCP connections that further increase network latency. Thus, in various embodiments, the STACKing agent can track information regarding pure $ACK_{REPLY}$'s in main memory or on-chip memory of the agent's network device instead of buffering them in the device's interface buffers or off-chip memory (e.g., filter or exclude the pure $ACK_{REPLY}$'s from the device's interface buffers or off-chip memory). The STACKing agent can re-generate the pure $ACK_{REPLY}$'s from the information stored for them in main memory, and transmit the re-generated $ACK_{REPLY}$'s according to traffic shaping policies specified for the traffic classes and congestion states to which the pure $ACK_{REPLY}$'s correspond.

Table 9 shows an example of the STACKing state information the STACKing agent can maintain for each STACKed flow, such as the TCP sequence number ($SEQ_{NO}$) of the latest Request ACK sent by the TCP sender ($ACK_{REQ}$), the TCP acknowledgement number $ACK_{NO}$ of the latest $ACK_{REQ}$, the $SEQ_{NO}$ of the latest Reply ACK received by the TCP sender ($ACK_{REPLY}$), the $ACK_{NO}$ of the latest $ACK_{REPLY}$, the $SEQ_{NO}$ of the latest re-generated $ACK_{REPLY}$ transmitted by the STACKing agent to the TCP sender on behalf of the receiver ($ACK_{PROXIED}$), the $ACK_{NO}$ of the latest $ACK_{PROXIED}$, and a target transmission rate timer ($TIMER_{TGT}$) for ensuring the STACKing agent can transmit re-generated $ACK_{REPLY}$'s at a target transmission rate or throughput ($TR_{TGT}$) specified by a traffic shaping policy. In some embodiments, the STACKing state information for each STACKed flow can also include a current window size $W_{LATEST}$, a current congestion threshold $T_{LATEST}$, a target window size $W_{TGT}$, and a target congestion threshold $T_{TGT}$. In other embodiments, the STACKing agent can obtain the current window size $W_{LATEST}$, the current congestion threshold $T_{LATEST}$, the target window size $W_{TGT}$, and the target congestion threshold $T_{TGT}$ dynamically as discussed further below. In still other embodiments, the target window size $W_{TGT}$, and the target congestion threshold $T_{TGT}$ can be determined for a traffic class and congestion state to which a STACKed flow corresponds.

TABLE 9

Example STACKing State Information

| STATE PARAMETER | DESCRIPTION |
| --- | --- |
| Latest $ACK_{REQ}$. $SEQ_{NO}$ | TCP sequence number of latest Request ACK transmitted by a TCP sender for a TCP flow |
| Latest $ACK_{REQ}$. $ACK_{NO}$ | TCP acknowledgment number of latest Request ACK transmitted by a TCP sender for a TCP flow |
| Latest $ACK_{REPLY}$. $SEQ_{NO}$ | TCP sequence number of latest Reply ACK received by a TCP sender for a TCP flow |
| Latest $ACK_{REPLY}$. $ACK_{NO}$ | TCP acknowledgment number of latest Reply ACK received by a TCP sender for a TCP flow |
| Latest $ACK_{PROXIED}$. $SEQ_{NO}$ | TCP sequence number of latest Reply ACK transmitted to a TCP sender on behalf of a TCP receiver for a TCP flow |
| Latest $ACK_{PROXIED}$. $ACK_{NO}$ | TCP acknowledgment number of latest Reply ACK transmitted to a TCP sender on behalf of a TCP receiver for a TCP flow |
| $TIMER_{TGT}$ | Timer for transmitting Reply ACKs to a TCP sender on behalf of a TCP receiver according to a Target Transmission Rate ($TR_{TGT}$) for a TCP flow |
| $ACK_{BYTES}$ | Cumulative or instant number of bytes transmitted by a TCP sender and acknowledged by a TCP receiver during an RTT sampling period for a TCP flow |
| $W_{LATEST}$ | Estimated window size of a TCP flow |
| $T_{LATEST}$ | Estimated congestion threshold of a TCP flow |
| $W_{TGT}$ | Target window size for traffic class corresponding to a TCP flow |
| $T_{TGT}$ | Target congestion threshold for traffic class corresponding to a TCP flow |

In some embodiments, an upstream system can manage multiple STACKing agents running within multiple network devices. The upstream system can maintain a global TCP flow table (e.g., Table 6) and/or global STACKing state table (e.g., Table 9) for storing STACKing state information for TCP flows of the multiple network devices managed by the upstream system. The upstream system can push some of this information to each STACKing agent and/or the STACKing agent can pull some of this information for STACKing purposes. Alternatively or in addition, the STACKing agent can push some of its local STACKing state information to the upstream system's global STACKing state table, or the upstream system can pull the STACKing agent's local STACKing state information to update the global STACKing state table.

At decision block 608, the STACKing agent can determine whether or not $ACK_{IN}$ is a pure $ACK_{REPLY}$. If $ACK_{IN}$ includes a payload, then $ACK_{IN}$ is not a pure $ACK_{REPLY}$, and the STACKing agent can conclude the process 600 by updating STACKing state information for $FLOW_{IN}$ and processing $ACK_{IN}$ as normal at step 610 (e.g., forward, drop, reject, queue, etc.). For example, the STACKing agent can update the STACKing state information for $FLOW_{IN}$ by setting the information for $FLOW_{IN}$'s latest TCP $ACK_{REQ}$ with the information of $ACK_{IN}$ (e.g., $SEQ_{NO}$, $ACK_{NO}$, etc.). In some cases, the network device can support piggybacking of TCP sender data in TCP $ACK_{REPLY}$ s, and the STACKing agent may process a TCP $ACK_{REPLY}$ having a payload as a separate TCP $ACK_{REPLY}$ and TCP $ACK_{REQ}$ similar to TCP segment numbers 5-6 in Table 8. In these situations, the $ACK_{IN}$ may be referred to as a nominally pure TCP $ACK_{REPLY}$, and the process 600 can continue to decision block 612 for handling the $ACK_{REPLY}$ portion of $ACK_{IN}$, and return to step 610 for handling the TCP $ACK_{REQ}$ portion of $ACK_{IN}$.

If $ACK_{IN}$ does not include a payload, then it is a pure $ACK_{REPLY}$ (or a nominally pure $ACK_{REPLY}$ in some cases), and the process 600 can proceed to decision block 612 in which the STACKing agent can determine whether $ACK_{IN}$ is a duplicate of the latest $ACK_{REPLY}$ for $FLOW_{IN}$. That is, if ($ACK_{IN}$.$SEQ_{NO}$==Latest $ACK_{REPLY}$.$SEQ_{NO}$ && $ACK_{IN}$.$ACK_{NO}$==Latest $ACK_{REPLY}$.$ACK_{NO}$), then $ACK_{IN}$ is a duplicate $ACK_{REPLY}$ from the TCP receiver indicating that the TCP receiver did not receive the $ACK_{REQ}$ having the $SEQ_{NO}$ and $ACK_{NO}$ of $ACK_{IN}$. The STACKing agent can address this at step 614 by immediately forwarding $ACK_{IN}$ to the TCP sender so that the TCP sender can retransmit the TCP segment corresponding to $ACK_{IN}$ to the TCP receiver, and delaying transmission of the next TCP $ACK_{REPLY}$ for $FLOW_{IN}$ to ensure the average transmission rate for $FLOW_{IN}$ remains within its target transmission rate. The STACKing agent may also use the selective ACK option (if enabled) to request for specific segments.

As an example, returning to Table 8, if the STACKing agent sequentially receives the $ACK_{REQ}$ corresponding to TCP segment number 6 from the web server, the $ACK_{REPLY}$ corresponding to TCP segment number 7 from the client, the $ACK_{REQ}$ corresponding to TCP segment number 8 from the web server, a duplicate $ACK_{REPLY}$ corresponding to TCP segment number 7 from the client (i.e., TCP segment numbers 6, 7, 8, 7), then the STACKing agent may assume that the $ACK_{REQ}$ corresponding to TCP segment number 8 has been lost. The STACKing agent can immediately forward the duplicate $ACK_{REPLY}$ corresponding to TCP segment number 7 to the web server so that the web server may retransmit the $ACK_{REQ}$ corresponding to TCP segment number 8 to the client, and the STACKing agent can delay transmission of the next $ACK_{REPLY}$ for the flow (e.g., the $ACK_{REPLY}$ corresponding to TCP segment number 8) to ensure the average transmission rate for the flow remains within its target transmission rate.

As another example, if the STACKing agent sequentially receives the $ACK_{REQ}$ corresponding to TCP segment number 6 from the web server, the $ACK_{REPLY}$ corresponding to TCP segment number 7 from the client, the $ACK_{REQ}$ corresponding to TCP segment number 10 from the web server, and a duplicate $ACK_{REPLY}$ corresponding to TCP segment number 7 from the client (i.e., 6, 7, 10, 7), then the STACKing agent may assume that the $ACK_{REQ}$ corresponding to TCP segment number 8 has been lost. The STACKing agent can immediately forward the duplicate $ACK_{REPLY}$ corresponding to TCP segment number 7 to the web server so that the web server may retransmit the $ACK_{REQ}$ corresponding to TCP segment number 8 to the client, and the STACKing agent can delay transmission of the next $ACK_{REPLY}$ for the flow (e.g., the $ACK_{REPLY}$ corresponding to TCP segment number 8) to ensure the average transmission rate for the flow remains within its target transmission rate.

If process 600 reaches step 616, then $ACK_{IN}$ represents a contiguously ordered TCP $ACK_{REPLY}$ for $FLOW_{IN}$. That is, the Instant $ACK_{BYTES}$==Latest $ACK_{REQ}$·LEN. At step 616, the STACKing agent can update the STACKing state information for $FLOW_{IN}$, such as setting the information of the latest $ACK_{REPLY}$ for $FLOW_{IN}$ to the information for $ACK_{IN}$ (e.g., $ACK_{IN}\cdot SEQ_{NO}$, $ACK_{IN}\cdot ACK_{NO}$, etc.). In some cases, the STACKing agent can also update the number of bytes acknowledged $ACK_{BYTES}$, the current window size $W_{LATEST}$, the current congestion threshold $T_{LATEST}$, the target window size $W_{TGT}$, the target congestion threshold $T_{TGT}$, and/or $RTT_{LATEST}$, where:

$$RTT_{LATEST} = \text{Latest } ACK_{REPLY}\text{TIME} - \text{Latest } ACK_{REQ}\text{TIME} \quad \text{(Equation 18)}$$

In some embodiments, the STACKing agent can receive one or more traffic class-specific window size and/or congestion threshold estimators 628 that the STACKing agent can apply to traffic data (e.g., TCP segment, TCP flow, etc.) to determine the current window size $W_{LATEST}$ and current congestion threshold $T_{LATEST}$ of $FLOW_{IN}$. As discussed above with respect to FIG. 4 and elsewhere in the present disclosure, the traffic class-specific window size and congestion threshold estimators 428 can comprise one or more regression models or other machine learning models whose input can be traffic data (e.g., TCP segment, TCP flow, etc.) and whose output is the current window size $W_{LATEST}$ and/or congestion threshold $T_{LATEST}$ of the traffic data when the traffic data corresponds to a particular traffic class and congestion state. For example, given $FLOW_{IN}$, one or more regression models can determine the current window size $W_{LATEST}$ and/or the current congestion threshold $T_{LATEST}$ of $FLOW_{IN}$.

In some embodiments, the STACKing agent can determine $W_{TGT}$ and/or $T_{TGT}$ based on traffic shaping policies specified for the traffic class and congestion state to which $FLOW_{IN}$ corresponds. In other embodiments, the STACKing agent can determine $W_{TGT}$ and $T_{TGT}$ based on current network conditions in addition or alternatively to the traffic shaping policies for the traffic class and congestion state to which $FLOW_{IN}$ corresponds. For example, $W_{TGT}$ can be derived from the Bandwidth-Delay Product (BDP), such as a product of the minimum of the specified maximum bandwidth for the traffic class and congestion state to which $FLOW_{IN}$ corresponds ($BW_{MAX}$) and the bandwidth of the capacity bottleneck link ($BL_{CAP}$), and an RTT of $FLOW_{IN}$ (e.g., $RTT_{MIN}$, $RTT_{MAX}$, $\overline{RTT}$, $RTT_{LATEST}$, etc.):

$$W_{TGT}(\text{bytes}) = (\min(BW_{MAX}, BL_{CAP})(\text{bps})/8)(RTT(\text{seconds})) \quad \text{(Equation 19)}$$

Another approach can determine $W_{TGT}$ as a product of a target transmission rate or throughput specified for the traffic class and congestion state to which $FLOW_{IN}$ corresponds ($TR_{TGT}$), and $RTT_{MAX}$ of $FLOW_{IN}$:

$$WS_{TGT}(\text{bytes}) = (TR_{TGT}(\text{bps})/8)(RTT_{MAX}(\text{seconds})) \quad \text{(Equation 20)}$$

The target congestion threshold $T_{TGT}$ can be the ratio between the target transmission rate or throughput specified for the traffic class and congestion state to which $FLOW_{IN}$ corresponds ($TR_{TGT}$) and the minimum of $BW_{MAX}$ and $BL_{CAP}$:

$$T_{TGT} = TR_{TGT}(\text{bps})/\min(BW_{MAX}, BL_{CAP})(\text{bps}) \quad \text{(Equation 21)}$$

Another approach can determine the target congestion threshold $T_{TGT}$ as the ratio between the maximum receiver window size ($rwnd_{MAX}$) and a product of the minimum of $BW_{MAX}$ and $BL_{CAP}$ and an RTT of $FLOW_{IN}$ (e.g., $RTT_{MIN}$, $RTT_{MAX}$, $\overline{RTT}$, $RTT_{LATEST}$, etc.):

$$T_{TGT} = \frac{rwnd_{MAX}(\text{bytes}) \times 8}{\min(BW_{MAX}, BL_{CAP})(bps) \times RTT \text{ (seconds)}} \quad \text{(Equation 22)}$$

At decision block 618, the STACKing agent can determine whether to initiate, continue, or suspend STACKing for FLOWN based on the current window size $W_{LATEST}$ and/or current congestion threshold $T_{LATEST}$. $W_{LATEST}$ and $T_{LATEST}$ can indicate whether $FLOW_{IN}$ has reached its target window size $W_{TGT}$ and target congestion threshold $T_{TGT}$. In some embodiments, the STACKing agent can use a simple heuristic to determine whether to initiate, continue, or suspend STACKing for $FLOW_{IN}$. For example, if ($W_{LATEST} \leq W_{TGT}$ and $T_{LATEST} \leq T_{TGT}$), then $FLOW_{IN}$ has not yet exceeded its target window size $W_{TGT}$ and target congestion threshold $T_{TGT}$. Therefore, the STACKing agent does not perform STACKing for FLOWN so that $FLOW_{IN}$ may hit its target window size $W_{TGT}$ and target congestion threshold $T_{TGT}$. Instead, the STACKing agent may conclude the process 600 by processing the TCP $ACK_{REPLY}$ as normal (e.g., forward, drop, reject, queue, etc.). In some embodiments, the STACKing agent may also update the STACKing state information for FLOWN to indicate suspension of STACKing for $FLOW_{IN}$ until the next RTT sampling period for $FLOW_{IN}$ or the next RTT sampling period for the traffic class to which $FLOW_{IN}$ corresponds.

In other embodiments, the decision to initiate, continue, or suspend STACKing for $FLOW_{IN}$ can be determined by one or more STACKing reinforcement learning agents 430 that the network device can apply to traffic data (e.g., TCP segment, TCP flow) to determine whether to initiate, continue, or suspend STACKing. As discussed above with respect to FIG. 4 and elsewhere in the present disclosure, the STACKing reinforcement learning agents 430 can comprise one or more reinforcement learning agents or other machine learning models that can receive input traffic data and output a decision whether to initiate, continue, or suspend STACKing for the traffic data to maximize a total reward (e.g., maximize transmission throughput) or minimize a total cost (e.g., minimize network latency).

If ($W_{LATEST} > W_{TGT} \| T_{LATEST} > T_{TGT}$), then $FLOW_{IN}$ has exceeded its target window size $W_{TGT}$ or target congestion threshold $T_{TGT}$, and the process 600 can conclude with the STACKing agent performing STACKing for $FLOW_{IN}$ at step 622, which can involve tracking STACKing state information of $FLOW_{IN}$ (e.g., Table 9) in main memory of the agent's network device, filtering or excluding the TCP $ACK_{REPLY}$'s of $FLOW_{IN}$ from the interface buffers or off-chip memory of the network device, re-generating the filtered TCP $ACK_{REPLY}$'s from the STACKing state information stored in main memory, and transmitting re-generated TCP $ACK_{REPLY}$'s at a transmission rate or throughput specified by a traffic shaping policy for the traffic class and congestion state to which $FLOW_{IN}$ corresponds ($TR_{TGT}$). For example, the STACKing agent can determine a target transmission rate $TR_{TGT}$ for $FLOW_{IN}$ from the traffic shaping policy, set a timer $TIMER_{TGT}$ for transmitting $ACK_{REPLY}$'s at the target transmission rate $TR_{TGT}$, re-generate an $ACK_{REPLY}$ having a $SEQ_{NO}$ corresponding to the latest $ACK_{PROXIED} \cdot SEQ_{NO}$ and an $ACK_{NO}$ corresponding to the latest $ACK_{PROXIED} \cdot ACK_{NO}$, transmitting the re-generated $ACK_{REPLY}$, and incrementing $ACK_{PROXIED} \cdot SEQ_{NO}$ and $ACK_{PROXIED} \cdot ACK_{NO}$ based on the target transmission rate $TR_{TGT}$ but no more than the latest $ACK_{REPLY} \cdot SEQ_{NO}$ and $ACK_{REPLY} \cdot ACK_{NO}$:

$$ACK_{PROXIED} \cdot SEQ_{NO} <= \text{Latest } ACK_{REPLY} \cdot SEQ_{NO} \quad \text{(Equation 23)}$$

$$ACK_{PROXIED} \cdot SEQ_{NO} <= \text{Latest } ACK_{REPLY} \cdot ACK_{NO} \quad \text{(Equation 24)}$$

The STACKing agent can continue to perform STACKing for $FLOW_{IN}$ until $FLOW_{IN}$ is no longer a congested flow, the estimated window size $W_{LATEST}$ and/or estimated congestion threshold $T_{LATEST}$ no longer exceed the target window size $W_{TGT}$ and/or target congestion threshold, respectively, or the STACKing reinforcement learning agents no longer determine that $FLOW_{IN}$ is suitable for STACKing.

Figure 7:
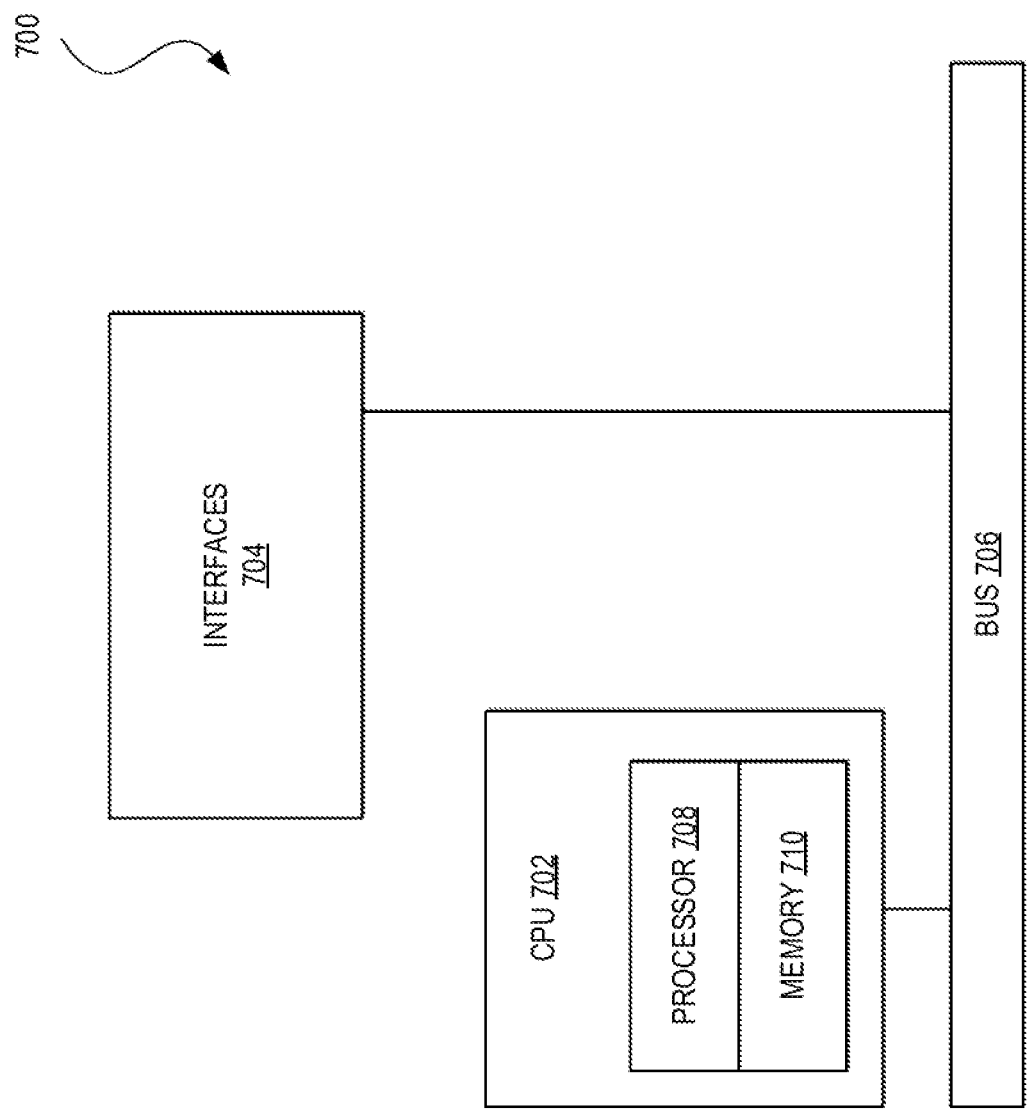
FIG. 7 illustrates a block diagram of an example of a network device in accordance with an embodiment.

FIG. 7 illustrates an example of a network device 700 (e.g., switch, router, network appliance, etc.). The network device 700 can include a master central processing unit (CPU) 702, interfaces 704, and a bus 706 (e.g., a Peripheral Component Interconnect (PCI) bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the Microprocessor without Interlocked Pipelined Stages (MIPS) family of microprocessors. In an alternative embodiment, the processor 708 can be specially designed hardware for controlling the operations of the network device 700. In an embodiment, a memory 710 (such as non-volatile Random Access Memory (RAM) and/or Read-Only Memory (ROM)) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8A:
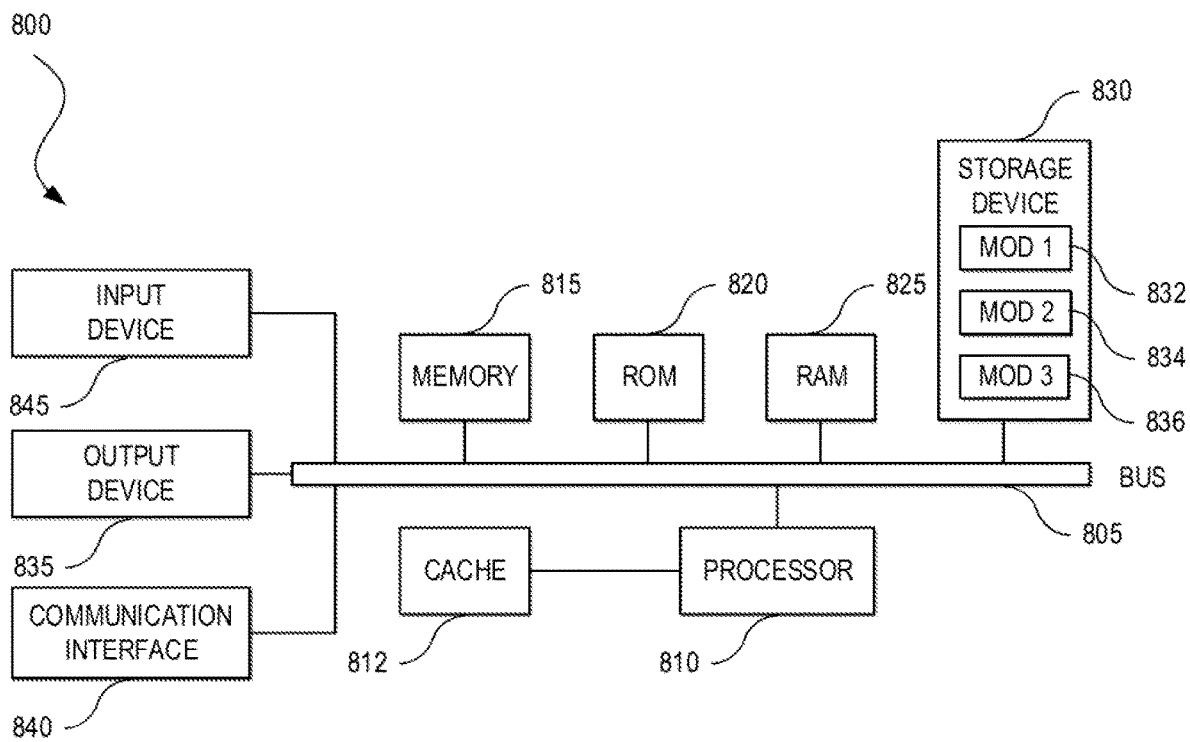
FIGS. 8A and 8B illustrate block diagrams of examples of computing systems in accordance with some embodiments.
Figure 8B:
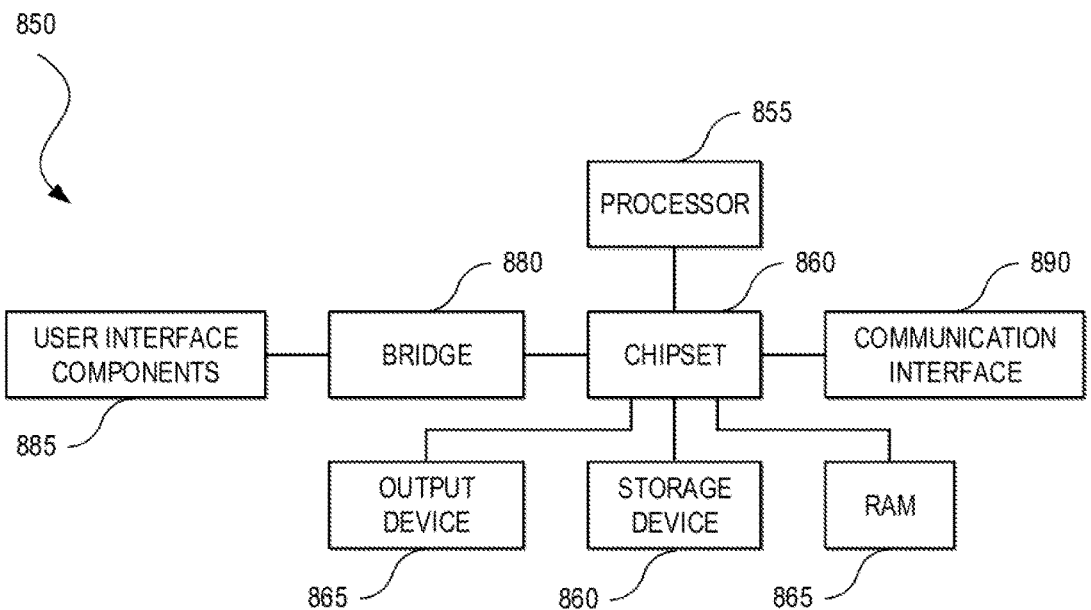

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
  receiving, at a network device, an input acknowledgment of an input flow;
  determining whether the input acknowledgment is part of a congested flow;
  in response to the input acknowledgment being part of the congested flow, determining whether the input acknowledgment is a pure reply acknowledgment;
  in response to the input acknowledgment being the pure reply acknowledgment, determining whether the input acknowledgment is a duplicate reply acknowledgment;
  in response to the input acknowledgment not being the duplicate reply acknowledgment, updating state information for the input flow;

determining whether to initiate or continue stacking acknowledgments for the input flow based on window size or congestion threshold; and in response to determining to initiate or continue stacking acknowledgments, initiating or continuing stacking acknowledgments for the input flow.

2. The method of claim 1, further comprising:
in response to the input acknowledgment not being part of the congested flow, processing the congested flow as normal.

3. The method of claim 1, further comprising:
in response to the input acknowledgment not being the pure reply acknowledgment, updating state information for the input flow and processing the input acknowledgment as normal.

4. The method of claim 1, wherein the input acknowledgment is the pure reply acknowledgment when the input acknowledgment includes a payload.

5. The method of claim 1, further comprising:
in response to the input acknowledgment being the duplicate reply acknowledgment, forwarding the input acknowledgment to sender for retransmission of a segment corresponding to the input acknowledgment and delaying transmission of a next reply acknowledgment for the input flow.

6. The method of claim 1, wherein determining whether to not initiate or continue the stacking acknowledgments further comprising:
determining whether a current window size is less than or equal to a target window size and a current congestion threshold is equal to a target congestion threshold.

7. The method of claim 1, further comprising:
in response to determining not to initiate or continue stacking acknowledgments, updating state information of the input flow and processing the reply acknowledgment as normal.

8. A network device comprising:
at least one processor; and
at least one memory, storing instructions which when executed by the at least one processor, causes the at least one processor to:
receive an input acknowledgment of an input flow;
determine whether the input acknowledgment is part of a congested flow;
in response to the input acknowledgment being part of the congested flow, determine whether the input acknowledgment is a pure reply acknowledgment;
in response to the input acknowledgment being the pure reply acknowledgment, determine whether the input acknowledgment is a duplicate reply acknowledgment;
in response to the input acknowledgment not being the duplicate reply acknowledgment, update state information for the input flow;
determine whether to initiate or continue stacking acknowledgments for the input flow based on window size or congestion threshold; and
in response to determining to initiate or continue stacking acknowledgments, initiate or continue stacking acknowledgments for the input flow.

9. The network device of claim 8, further comprising instructions which when executed by the at least one processor, causes the at least one processor to:
in response to the input acknowledgment not being part of the congested flow, process the congested flow as normal.

10. The network device of claim 8, further comprising instructions which when executed by the at least one processor, causes the at least one processor to:
in response to the input acknowledgment not being the pure reply acknowledgment, update state information for the input flow and processing the input acknowledgment as normal.

11. The network device of claim 8, wherein the input acknowledgment is the pure reply acknowledgment when the input acknowledgment includes a payload.

12. The network device of claim 8, further comprising instructions which when executed by the at least one processor, causes the at least one processor to:
in response to the input acknowledgment being the duplicate reply acknowledgment, forward the input acknowledgment to sender for retransmission of a segment corresponding to the input acknowledgment and delay transmission of a next reply acknowledgment for the input flow.

13. The network device of claim 8, wherein determining whether to not initiate or continue the stacking acknowledgments further comprises instructions which when executed by the at least one processor, causes the at least one processor to:
determine whether a current window size is less than or equal to a target window size and a current congestion threshold is equal to a target congestion threshold.

14. The network device of claim 8, further comprising instructions which when executed by the at least one processor, causes the at least one processor to:
in response to determining not to initiate or continue stacking acknowledgments, update state information of the input flow and processing the reply acknowledgment as normal.

15. At least one non-transitory computer readable medium, storing instructions which when executed by at least one processor, causes the at least one processor to:
receive an input acknowledgment of an input flow;
determine whether the input acknowledgment is part of a congested flow;
in response to the input acknowledgment being part of the congested flow, determine whether the input acknowledgment is a pure reply acknowledgment;
in response to the input acknowledgment being the pure reply acknowledgment, determine whether the input acknowledgment is a duplicate reply acknowledgment;
in response to the input acknowledgment not being the duplicate reply acknowledgment, update state information for the input flow;
determine whether to initiate or continue stacking acknowledgments for the input flow based on window size or congestion threshold; and
in response to determining to initiate or continue stacking acknowledgments, initiate or continue stacking acknowledgments for the input flow.

16. The at least one non-transitory computer readable medium of claim 15, further comprising instructions which when executed by the at least one processor, causes the at least one processor to:
in response to the input acknowledgment not being part of the congested flow, process the congested flow as normal.

17. The at least one non-transitory computer readable medium of claim 15, further comprising instructions which when executed by the at least one processor, causes the at least one processor to:

in response to the input acknowledgment not being the pure reply acknowledgment, update state information for the input flow and processing the input acknowledgment as normal.

18. The at least one non-transitory computer readable medium of claim 15, wherein the input acknowledgment is the pure reply acknowledgment when the input acknowledgment includes a payload.

19. The at least one non-transitory computer readable medium of claim 15, further comprising instructions which when executed by the at least one processor, causes the at least one processor to:
in response to the input acknowledgment being the duplicate reply acknowledgment, forward the input acknowledgment to sender for retransmission of a segment corresponding to the input acknowledgment and delay transmission of a next reply acknowledgment for the input flow.

20. The at least one non-transitory computer readable medium of claim 15, wherein determining whether to not initiate or continue the stacking acknowledgments further comprises instructions which when executed by the at least one processor, causes the at least one processor to:
determine whether a current window size is less than or equal to a target window size and a current congestion threshold is equal to a target congestion threshold.

* * * * *